United States Patent
Kudo

(10) Patent No.: US 12,466,429 B2
(45) Date of Patent: Nov. 11, 2025

(54) TRAVELING CONTROL APPARATUS FOR VEHICLE

(71) Applicant: SUBARU CORPORATION, Tokyo (JP)

(72) Inventor: Shinya Kudo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 291 days.

(21) Appl. No.: 18/176,027

(22) Filed: Feb. 28, 2023

(65) Prior Publication Data

US 2023/0294731 A1    Sep. 21, 2023

(30) Foreign Application Priority Data

Mar. 15, 2022   (JP) .................. 2022-040731

(51) Int. Cl.
*B60W 60/00* (2020.01)
*B60W 30/18* (2012.01)
*B60W 40/06* (2012.01)

(52) U.S. Cl.
CPC .... *B60W 60/001* (2020.02); *B60W 30/18009* (2013.01); *B60W 40/06* (2013.01); *B60W 2552/00* (2020.02); *B60W 2554/80* (2020.02)

(58) Field of Classification Search
CPC ......... B60W 60/001; B60W 30/18009; B60W 40/06; B60W 2552/00; B60W 2554/80; B60W 2556/40; B60W 30/18154; B60W 30/18159

See application file for complete search history.

(56) References Cited

U.S. PATENT DOCUMENTS

| | | | |
|---|---|---|---|
| 2011/0060505 A1* | 3/2011 | Suzuki | B60T 7/12 701/41 |
| 2017/0336218 A1* | 11/2017 | Beaurepaire | G08G 1/166 |
| 2019/0225219 A1* | 7/2019 | Ueda | B60W 10/20 |
| 2020/0172089 A1* | 6/2020 | Dyer | G08G 1/168 |
| 2020/0348676 A1* | 11/2020 | Zhou | G06N 20/00 |
| 2021/0004011 A1* | 1/2021 | Oh | G05D 1/0088 |
| 2021/0096573 A1* | 4/2021 | Yu | G05D 1/0219 |

(Continued)

FOREIGN PATENT DOCUMENTS

JP    2017-61223 A    3/2017

*Primary Examiner* — Jelani A Smith
*Assistant Examiner* — Alyssa Rorie
(74) *Attorney, Agent, or Firm* — Rimon P.C.

(57) ABSTRACT

A surrounding environment information acquisition device acquires surrounding environment information. A map information acquisition device acquires road information. A traveling control unit causes the vehicle to travel along a preset target traveling route. When recognizing an intersection in which U-turn traveling control for performing a U-turn travel to an oncoming lane is scheduled to be performed on the target traveling route and in front of the vehicle, the traveling control unit performs one or both of: setting a traveling course laterally shifted by a predetermined distance in a direction opposite to the oncoming lane within a traveling lane of the vehicle; and setting a steering start point in the U-turn travel at a position farther from the vehicle in the traveling direction than a steering start point to be set when left/right turn traveling control to cross the oncoming lane at the intersection to enter a cross road.

6 Claims, 6 Drawing Sheets

(56) References Cited

U.S. PATENT DOCUMENTS

2021/0197865 A1* 7/2021 Zhou ................ B60W 60/0025
2021/0221355 A1* 7/2021 Kang ................... B62D 15/025
2023/0266141 A1* 8/2023 Liu ........................ G08G 1/167

* cited by examiner

TRAVELING CONTROL APPARATUS FOR VEHICLE

CROSS-REFERENCE TO RELATED APPLICATIONS

The present application claims priority from Japanese Patent Application No. 2022-040731 filed on Mar. 15, 2022, the entire contents of which are hereby incorporated by reference.

BACKGROUND

The disclosure relates to a traveling control apparatus for a vehicle. Recently, a development has been made on an automatic driving control technology for automatically driving a vehicle such as an automobile without involving a driver's driving operation. Further, various traveling control apparatuses that achieve various traveling control to assist driver's driving operations using the automatic driving control technology have been proposed and put to general practical use.

For example, Japanese Unexamined Patent Application Publication (JP-A) No. 2017-61223 discloses a traveling control apparatus for a vehicle that makes it possible to perform traveling control in which a target traveling route is set and a vehicle is caused to travel accurately and smoothly along the set target traveling route.

In a case where ordinary automatic driving control is performed by a traveling control apparatus for a vehicle, an appropriate target traveling route is automatically set on the basis of designation of a desired destination and a desired waypoint. The target traveling route set in the ordinary automatic driving control involves U-turn travel in some cases.

In a case where a commercial facility or a shop such as a restaurant located aside an opposite traveling lane is designated as a destination or a waypoint, for example, the vehicle is to perform the U-turn travel in an intersection or the like after passing by the designated position. Some of the traveling routes include a traveling lane dedicated to U-turns which is located ahead of an intersection in which right turns are prohibited, for example.

SUMMARY

An aspect of the disclosure provides a traveling control apparatus for a vehicle. The traveling control apparatus includes a surrounding environment information acquisition device, a map information acquisition device, and a traveling control unit. The surrounding environment information acquisition device is configured to acquire surrounding environment information on a surrounding environment of the vehicle. The map information acquisition device is configured to acquire road information on a road present near a traveling position of the vehicle. The traveling control unit is configured to cause the vehicle to travel along a target traveling route preliminarily set. The traveling control unit is configured to, upon recognizing an intersection in which U-turn traveling control for performing a U-turn travel to an oncoming lane is scheduled to be performed on the target traveling route and in front of the vehicle, perform one or both of: setting a traveling course shifted by a predetermined distance in a lateral direction within a traveling lane of the vehicle; and setting a steering start point in the U-turn travel at a position farther from the vehicle in the traveling direction than a steering start point to be set when left/right turn traveling control to cross the oncoming lane at the intersection to enter a cross road. The lateral direction is opposite to the oncoming lane.

An aspect of the disclosure provides a traveling control apparatus for a vehicle. The traveling control apparatus includes circuitry. The circuitry is configured to acquire surrounding environment information on a surrounding environment of the vehicle, acquire road information on a road present near a traveling position of the vehicle, and cause the vehicle to travel along a target traveling route preliminarily set. The circuitry is configured to, upon recognizing an intersection in which U-turn traveling control for performing a U-turn travel to an oncoming lane is scheduled to be performed on the target traveling route and in front of the vehicle, perform one or both of: setting a traveling course shifted by a predetermined distance in a lateral direction within a traveling lane of the vehicle; and setting a steering start point in the U-turn travel at a position farther from the vehicle in the traveling direction than a steering start point to be set when left/right turn traveling control to cross the oncoming lane at the intersection to enter a cross road. The lateral direction is opposite to the oncoming lane.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
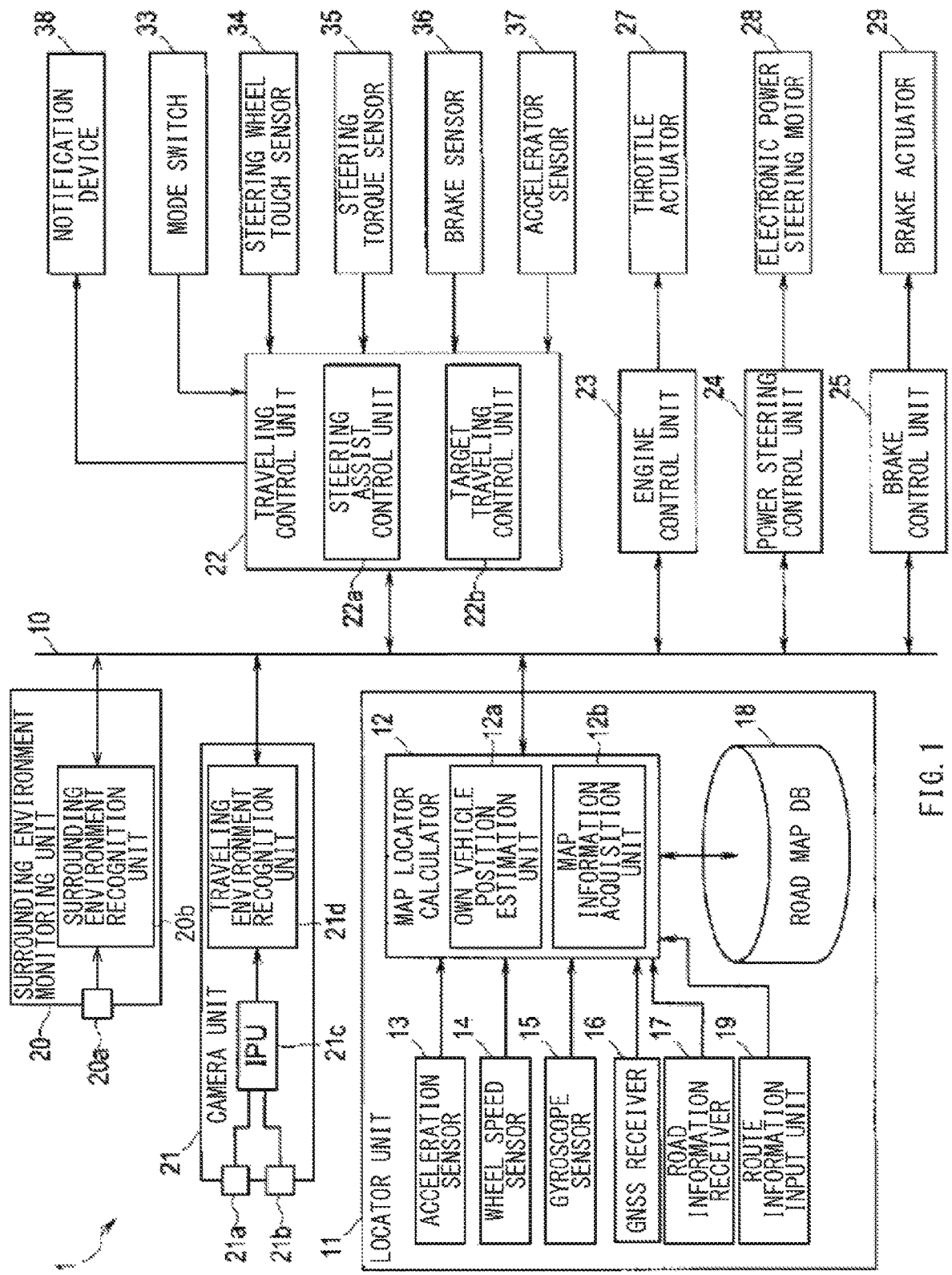
FIG. 1 is a block diagram illustrating a schematic configuration of a traveling control apparatus according to one example embodiment of the disclosure.

Automatic driving control performed by a traveling control apparatus disclosed in JP-A No. 2017-61223 fails to take into consideration of U-turn traveling control at, in particular, an intersection.

It is desirable to provide a traveling control apparatus for a vehicle that makes it possible to achieve safer traveling while maintaining a smooth traffic flow even if a target traveling route set in automated driving control involves U-turn traveling control at, in particular, an intersection.

Some example embodiments of the disclosure will now be described with reference to the accompanying drawings. Each of the drawings used in the following description are schematic, and the dimension relationship, the scale, and the like are different between components to illustrate each of the components in a size recognizable in each of the drawings. Factors including, without limitation, numbers, shapes, ratios of dimensions, and relative positions of components illustrated in each of the drawings are illustrative only and not to be construed as limiting to the disclosure. Further, elements in the following example embodiments which are not recited in a most-generic independent claim of the disclosure are optional and may be provided on an as-needed basis.

A traveling control apparatus according to an example embodiment of the disclosure may be mountable on a vehicle such as an automobile. The vehicle on which the traveling control apparatus according to an example embodiment of the disclosure is mounted is hereinafter referred to as an own vehicle. The traveling control apparatus performs traveling control to assist driving operations of a driver who drives the own vehicle and automatic driving control to cause the own vehicle to automatically travel along a target traveling route preliminarily set.

The traveling control apparatus according to the example embodiment causes a surrounding environment information acquisition device to acquire information on a surrounding environment of the own vehicle. The surrounding environment information acquisition device may include sensing devices such as an in-vehicle camera unit or a radar device. The information on the surrounding environment of the own vehicle may include information on other vehicles and bicycles traveling near the own vehicle, mobile bodies such as pedestrians, various structures such as buildings and side walls, three-dimensional obstacles, traffic signs, and traffic marks on road surfaces, for example. Hereinafter, the information on the surrounding environment of the own vehicle is simply referred to as surrounding environment information.

Further, the traveling control apparatus according to the example embodiment acquires road information on the basis of various pieces of information acquired by the surrounding environment information acquisition device described above, high-definition map information acquired by the traveling control apparatus communicating with a high-definition road map database that is an external system, and other pieces of information. The road information may include data on road conditions such as a preceding vehicle, a following vehicle, various structures, three-dimensional obstacles, traffic signs, traffic marks on road surfaces, road shapes, and intersections, for example.

The traveling control apparatus according to the example embodiment may use these pieces of information (the surrounding environment information, the map information, and other pieces of information recognized) as appropriate in traveling control to assist driver's driving operations and automatic driving control.

The traveling control apparatus according to the example embodiment of the disclosure is characterized by vehicle traveling control performed in a case where a target traveling route preliminarily set in the automatic driving control involves U-turn traveling control in an intersection (hereinafter referred to as intersection U-turn traveling control).

First, a schematic configuration of a traveling control apparatus according to an example embodiment of the disclosure is described with reference to a block diagram in FIG. 1. FIG. 1 illustrates a schematic configuration of a traveling control apparatus 1 according to an example embodiment of the disclosure.

The traveling control apparatus 1 according to the example embodiment may have a configuration substantially the same as the configuration of an existing traveling control apparatus of a similar type. Thus, the following description of the configuration of the traveling control apparatus 1 according to the example embodiment focuses on parts of the configuration relevant to the disclosure and omits description of other detailed parts of the configuration substantially the same as those of the existing traveling control apparatus. Further, FIG. 1 illustrates only the configuration of the traveling control apparatus 1 relevant to the example embodiment of the disclosure and omits illustration of the detailed configurations irrelevant to the example embodiment of the disclosure.

As illustrated in FIG. 1, the traveling control apparatus 1 according to the example embodiment may include a locator unit 11, a surrounding environment monitoring unit 20, a camera unit 21, a traveling control unit 22, an engine control unit 23, a power steering control unit 24, and a brake control unit 25 as constituting units. In one embodiment, the traveling control unit 22 may serve as a "traveling control unit".

The locator unit 11, the surrounding environment monitoring unit 20, and the camera unit 21 may be constituting units serving as sensor units or environment recognition devices that recognize environments inside and outside the own vehicle. These units (the locator unit 11, the surrounding environment monitoring unit 20, and the camera unit 21) may be constituting units that operate completely independently from each other.

The control units including the traveling control unit 22, the engine control unit 23, the power steering control unit 24, and the brake control unit 25 may be coupled to the locator unit 11, the surrounding environment monitoring unit 20, and the camera unit 21 via an in-vehicle communication line 10 such as a controller area network (CAN), and may perform data sharing among these components as appropriate and as needed.

The locator unit 11 may estimate a position of the own vehicle on a road map (hereinafter simply referred to as an own vehicle position) and acquire map information on the road in front of the estimated own vehicle position, for example. In one embodiment, the locator unit 11 may serve as a "map information acquisition device".

The locator unit 11 may include, for example, a map locator calculator 12, an acceleration sensor 13, a wheel speed sensor 14, a gyroscope sensor 15, a GNSS receiver 16, a road information receiver 17, a high-definition road map database 18, and a route information input unit 19. The high-definition road map database 18 may serve as a map information storage.

The acceleration sensor 13, the wheel speed sensor 14, and the gyroscope sensor 15 may be sensors to be used to estimate the own vehicle position. For example, the acceleration sensor 13 may detect a frontward-backward acceleration rate of the own vehicle. The wheel speed sensor 14 may detect a revolution speed of each of front, rear, left, and right wheels in a case where the own vehicle is a four-wheel vehicle. The gyroscope sensor 15 may detect an angular speed or an angular acceleration rate of the own vehicle. The acceleration sensor 13, the wheel speed sensor 14, and the gyroscope sensor 15 may constitute an autonomous traveling sensor group that serves as a driving condition acquisition unit. These sensors may be coupled to an input side of the map locator calculator 12.

While the own vehicle is traveling in an environment such as inside a tunnel where the own vehicle has difficulty in receiving effective positioning signals due to decreased receiving sensitivity to non-illustrated GNSS satellites, the autonomous traveling sensor group including the acceleration sensor 13, the wheel speed sensor 14, and the gyroscope sensor 15 may cause the own vehicle to perform autonomous traveling. The autonomous traveling sensor group may include a vehicle speed sensor and a yaw rate sensor that are not illustrated, as well as the acceleration sensor 13, the wheel speed sensor 14, and the gyroscope sensor 15 that are described above.

The GNSS receiver 16 may serve as an own vehicle position acquisition unit. The GNSS receiver 16 may receive various kinds of information from, for example, the global navigation satellite system (GNSS). That is, the GNSS receiver 16 may receive positional signals transmitted from multiple positioning satellites. The GNSS receiver 16 may output the received positioning signals to the map locator calculator 12 of the locator unit 11. The map locator calculator 12 may estimate the own vehicle position (latitude and longitude) on the basis of the positioning signals transmitted from the multiple positioning satellites to the GNSS receiver 16. For this purpose, the GNSS receiver 16 may be coupled to the input side of the map locator calculator 12.

Further, other components including the road information receiver 17, the high-definition road map database 18, and the route information input unit 19 may be coupled to the map locator calculator 12.

The road information receiver 17 may be communicable with a non-illustrated cloud server via a predetermined base station (not illustrated) or the Internet, and may receive and acquire various kinds of information stored in the cloud server, for example. Examples of the information acquired by the road information receiver 17 may include information necessary for automatic driving, and map information. The road information receiver 17 may output the acquired information to the map locator calculator 12 of the locator unit 11. Optionally, the road information receiver 17 may send various kinds of information owned by the own vehicle to the cloud server via the base station. In this case, the road information receiver 17 may serve as a road information transmitter.

The map locator calculator 12 may perform map matching of the own vehicle position on the basis of the map information received by the road information receiver 17, and may construct a target traveling route connecting an inputted destination to the own vehicle position.

Further, the map locator calculator 12 may set a target traveling route along which automatic driving is to be performed on the constructed target traveling route. The target traveling route for the automatic driving may extend several kilometers ahead of the own vehicle position. Examples of items to be set as the target traveling route may include a lane (e.g., one of three lanes of the road) on which the own vehicle is to travel, lane changing to overtake a preceding vehicle, and a timing of the lane changing.

The high-definition road map database 18 may be a mass storage medium such as a hard disk drive (HDD) or a solid state drive (SSD), for example. The high-definition road map database 18 may store known high-definition road map data such as a local dynamic map. The high-definition road map data may have the same layer structure as a global dynamic map stored in the non-illustrated cloud server, for example. The layer structure may have a static information layer as an undermost layer or a base layer. In the static information layer, additional map information and other pieces of information to be used to support the automatic traveling may be superimposed.

The additional map information may include static position information and dynamic position information. Examples of the static position information may include information on road types (ordinary roads or highway roads), road shapes, left and right dividing lines (e.g., a road center line, a road outer line, and a lane borderline), exits of highway roads or bypass roads, the distance from an entrance to an exit (from a start point to an end point) of a branching lane or a merging lane connected to a junction, a rest area, or a parking areas, traffic signs, and traffic marks on road surfaces. Examples of the dynamic position information may include information on traffic congestion, traffic accidents, and traffic regulations due to road construction.

When the target traveling route is set by the map locator calculator 12, the additional map information may be continuously acquired from the global dynamic map and sequentially updated as the surrounding environment information necessary to cause the own vehicle to perform autonomous traveling along the set target traveling route.

The high-definition road map data may further include lane data necessary to perform the automatic driving. Examples of the lane data may include data on a lane width, data on the coordinates of a middle position of a lane, data on an advancing azimuth angle of a lane, and data on a speed limit. These pieces of the lane data may be stored for each lane on the road map at an interval of several meters.

The route information input unit 19 may be a terminal device to be operated by an occupant such as a driver or a passenger in the own vehicle. A series of information items necessary for the map locator calculator 12 to set the target traveling route may be collectively inputted to the route information input unit 19. The information items may include information to specify a destination and a waypoint, such as a commercial facility, a restaurant or another shop, a rest area, or a roadside station located on the way to the destination.

The route information input unit 19 may be, for example, an input unit such as a touch panel of a monitor of a car navigation system, a portable device such as a smartphone, or a personal computer. The route information input unit 19 may be coupled to the map locator calculator 12 by wired communication or wireless communication. Accordingly, when the driver or the occupant operates the route information input unit 19 to input the information on a destination and a waypoint (e.g., the name, address, and phone number of a facility), the inputted information may be read by the map locator calculator 12. The map locator calculator 12 may set the coordinates (latitudes and longitudes) of the positions of the destination and the waypoint inputted to the route information input unit 19.

The map locator calculator 12 may include an own vehicle position estimation unit 12a and a map information acquisition unit 12b.

The own vehicle position estimation unit 12a may be a constituting component that estimates the own vehicle position. The own vehicle position estimation unit 12a may acquire the coordinates (latitude and longitude) of the own vehicle position on the basis of positioning signals received by the GNSS receiver 16. Thereafter, the own vehicle position estimation unit 12a may perform map matching of the acquired position coordinates on route map information to estimate the own vehicle position (a current position of the own vehicle) on the road map.

Further, while the own vehicle is traveling in an environment such as inside a tunnel where the own vehicle has difficulty in receiving effective positioning signals from the positioning satellites due to decreased receiving sensitivity of the GNSS receiver 16, the own vehicle position estimation unit 12*a* may make a switch to autonomous navigation in which the own vehicle position is estimated on the basis of various kinds of data including data on the vehicle speed calculated on the basis of wheel speeds detected by the wheel speed sensor 14, data on the angular speed detected by the gyroscope sensor 15, and data on the frontward-backward acceleration rate detected by the acceleration sensor 13, and may estimate the position (latitude and longitude) of the own vehicle on the road map.

On the basis of the own vehicle position information (the information on the latitude and longitude of the own vehicle position) estimated by the own vehicle position estimation unit 12*a* and the information on the positions (latitudes and longitudes) of the destination and the waypoint inputted by the driver or the occupant to the route information input unit 19, the map information acquisition unit 12*b* may construct information on a target traveling route from a current location to the destination following a preset route condition. For example, the target traveling route may be a route connecting the own vehicle position to the destination (via the waypoint, if any) in the high-definition road map data. The preset route condition may be, for example, a recommended route or the quickest route. In this case, the own vehicle position estimation unit 12*a* may identify the traveling lane on which the own vehicle is traveling, acquire the road shapes of the traveling lane and a merging lane stored in the road map data, and sequentially store these pieces of information. Further, the map information acquisition unit 12*b* may send the information on the target traveling route to the own vehicle position estimation unit 12*a*.

As described above, the map locator calculator 12 may perform map matching of the own vehicle position estimated by the own vehicle position estimation unit 12*a* on the road map to thereby identify a current position of the own vehicle, and may acquire road map information including the surrounding environment information of the own vehicle. Further, the map locator calculator 12 may cause the map information acquisition unit 12*b* to set the target traveling route of the own vehicle.

The camera unit 21 may be a part of the surrounding environment information acquisition device that recognizes an environment in a traveling direction of (in front of) the own vehicle, for example, and may acquire the environment as image information.

The camera unit 21 may acquire various kinds of information on the surrounding environment of the road. Examples of the information on the surrounding environment of the road may include: information on three-dimensional objects including mobile bodies such as another vehicle traveling in front of the own vehicle on the same lane or another vehicle traveling in front of the own vehicle on an adjacent lane (e.g., a preceding vehicle, an oncoming vehicle, a vehicle traveling side by side, and a following vehicle), and a bicycle or a motorcycle traveling side by side; and information on signal indication (e.g., the color of a traffic light, the flashing state of a traffic light, and the direction of a signal arrow), traffic signs, stop lines, and road marks such as dividing lines (e.g., a road center line, a road outer line, and a lane borderline).

The camera unit 21 may be fixed to an internal front portion of the vehicle compartment of the own vehicle at an upper central position, for example. The camera unit 21 may include an in-vehicle camera, an image processing unit (IPU) 21*c*, and a traveling environment recognition unit 21*d*, for example. The in-vehicle camera may be a stereo camera including a main camera 21*a* and a subsidiary camera 21*b* that are disposed at respective positions horizontally symmetric about an axis extending along the middle of the vehicle width.

The main camera 21*a* of the camera unit 21 may acquire reference image data, and the subsidiary camera 21*b* of the camera unit 21 may acquire comparative image data. The two pieces of image data acquired by the main camera 21*a* and the subsidiary camera 21*b* may be subjected to predetermined image processing at the IPU 21*c*.

The traveling environment recognition unit 21*d* may read the reference image data and the comparative image data subjected to the image processing at the IPU 21*c*, and may recognize an identical object appearing in both of the reference image data and the comparative image data on the basis of a parallax between the reference image data and the comparative image data. Further, the traveling environment recognition unit 21*d* may calculate distance data (i.e., data on the distance from the own vehicle to the identified object) on the basis of the amount of positional shift of the identified object between the reference image data and the comparative image data using the principal of triangulation, and may generate front environment image information (hereinafter also referred to as distance image information) including the distance data.

On the basis of the distance image information acquired by the camera unit 21 and subjected to the image processing at the IPU 21*c*, for example, the traveling environment recognition unit 21*d* may recognize various kinds of road signs, such as a dividing line (e.g., a road center line, a road outer line, and a lane borderline) that define the left or right side of the lane on which the own vehicle is traveling as the surrounding environment information. In this case, the traveling environment recognition unit 21*d* may serve as a dividing line detector that detects dividing lines of a traveling lane.

Further, the traveling environment recognition unit 21*d* may calculate the curvature [1/m] of the middle of an own-vehicle traveling lane which is defined between left and right dividing lines (lane borderlines) and on which the own vehicle is traveling, and the width between the left and right dividing lines (i.e., a lane width).

The curvature of the middle of the road between the dividing lines and the lane width may be calculated various known ways. For example, the traveling environment recognition unit 21*d* may recognize the left and right dividing lines by performing a binarization process on front environment image information on the basis of luminance differences. The traveling environment recognition unit 21*d* may calculate the curvatures of the recognized left and right dividing lines for each predetermined section using a curve approximate expression based on a least-square method, for example. Further, the traveling environment recognition unit 21*d* may calculate a lane width from a difference between the curvatures of the left and right dividing lanes. Thereafter, the traveling environment recognition unit 21*d* may calculate a road curvature of the middle of the lane on the basis of the curvatures of the left and right dividing lanes of the own-vehicle traveling lane and the width of the own-vehicle traveling lane.

The traveling environment recognition unit 21*d* may perform predetermined pattern matching on the distance image information to thereby recognize guardrails and curbstones extending along the road, three-dimensional objects of various types (e.g., pedestrians, two-wheel vehicles, and vehicles other than two-wheel vehicles present around the own vehicle), and road signs, for example. When recognizing a three-dimensional object, the traveling environment recognition unit 21*d* may recognize the type of the three-dimensional object, a distance from the own vehicle to the three-dimensional object, a moving speed of the three-dimensional object, and a relative speed between the three-dimensional object and the own vehicle, for example. The surrounding environment information recognized by the traveling environment recognition unit 21*d* may be outputted to the traveling control unit 22.

The surrounding environment monitoring unit 20 may serve as a part of the surrounding environment information acquisition device that recognizes and acquires the surrounding environment of the own vehicle as information. The surrounding environment monitoring unit 20 may include a surrounding environment recognition sensor 20*a* and a surrounding environment recognition unit 20*b*, for example.

The surrounding environment recognition sensor 20*a* may be, for example, an autonomous sensor group that includes sensing devices such as an ultrasonic sensor, a millimeter-wave radar, a light detection and ranging (LIDAR), and a camera in combination and that serves as a surrounding environment detector.

In one example, the surrounding environment recognition sensor 20*a* may include multiple millimeter-wave radars that are disposed at respective corners of the own vehicle (e.g., a left-front radar, a right-front radar, a left-rear radar, and a right-rear radar). The left-front radar and the right-front radar may be disposed on the left and right sides of a front bumper, respectively, for example. The left-front radar and the right-front radar may be used to monitor a part of a region around the own vehicle that is difficult to be recognized from images acquired by the main camera 21*a* and the subsidiary camera 21*b* of the camera unit 21 (e.g., a region extending diagonally forward from the left or right side of the own vehicle and a region on the left or right side of the own vehicle).

The left-rear radar and the right-rear radar may be disposed on the left and right sides of a rear bumper, for example. The left-rear radar and the right-rear radar may be used to monitor a part of a region around the own vehicle that is difficult to be monitored by the left-front radar and the right-front radar (e.g., a region extending backward from the left or right side of the vehicle).

The surrounding environment recognition unit 20*b* may acquire the surrounding environment information regarding mobile bodies (e.g., a vehicle traveling side by side, a following vehicle, and an oncoming vehicle) present around the own vehicle on the basis of an output signal received from the surrounding environment recognition sensor 20*a*.

In one embodiment, the surrounding environment monitoring unit 20 and the camera unit 21 may serve as the "surrounding environment information acquisition device" of the traveling control apparatus 1 according to the example embodiment. The traveling environment recognition unit 21*d* of the camera unit 21 and the surrounding environment recognition unit 20*b* of the surrounding environment monitoring unit 20 may be coupled to an input side of the traveling control unit 22 via the in-vehicle communication line 10. The traveling control unit 22 and the map locator calculator 12 may be coupled to each other via the in-vehicle communication line 10 in a mutually communicable manner.

A group of multiple switches or a group of multiple sensors that detects vehicle interior environment information may be coupled to the input side of the traveling control unit 22. The group of multiple switches or the group of multiple sensors may include a mode switch 33, a steering wheel touch sensor 34, a steering torque sensor 35, a brake sensor 36, and an accelerator sensor 37.

The mode switch 33 may include a group of switches to be operated by the driver who drives the own vehicle to select one of various driving modes or turn on or off control operations relevant to drive assist control. The driver may selectively switch each of the driving modes between being turned on and being turned off by operating the mode switch 33.

The steering wheel touch sensor 34 may detect whether a steering wheel of a steering device (not illustrated and hereinafter simply referred to as a steering) is held by the driver, i.e., a steering holding state of the driver. The steering wheel touch sensor 34 may be disposed on a predetermined portion of the steering of the own vehicle. While the driver is holding a predetermined portion of the steering, i.e., while the steering is held by the driver, the steering wheel touch sensor 34 may output an ON signal.

The steering torque sensor 35 may detect a steering torque amount and a steering angle as the amount of driving operation performed by the driver. The steering torque sensor 35 may be disposed on a non-illustrated steering shaft of the steering device of the own vehicle.

The steering wheel touch sensor 34 and the steering torque sensor 35 may serve as a steering holding state recognition unit that recognizes the steering holding state of the driver who drives the own vehicle. Output signals from the steering wheel touch sensor 34 and the steering torque sensor 35 may be sent to the traveling control unit 22.

The brake sensor 36 may detect the amount of depression of a brake pedal as the amount of driving operation performed by the driver.

The accelerator sensor 37 may detect the amount of depression of an accelerator pedal as the amount of driving operation performed by the driver.

A notification device 38 may be coupled to an output side of the traveling control unit 22. The notification device 38 may include a monitor panel and a speaker, for example. The notification device 38 may send the driver a notification in accordance with the surrounding environment recognized by the traveling control unit 22 on the basis of the surrounding environment information acquired by the traveling environment recognition unit 21*d* and the surrounding environment recognition unit 20*b*, for example. Examples of the notification may include a visual notification such as displaying of a notification on a display device (e.g., the monitor panel) and an audible notification such as outputting sounds or alarms from a sound outputting device (e.g., the speaker).

The notification device 38 may output a notification to urge the driver to perform a predetermined operation in a visual and/or audible manner as appropriate and as needed. For example, the notification device 38 may output a notification indicating "Press the brake pedal.", "Take your foot off the accelerator.", or "Correct the steering operation".

The traveling control unit 22 may be a constituting unit that comprehensively performs overall control of the own vehicle and performs predetermined traveling control on the basis of output information from the surrounding environment information acquisition device (i.e., the surrounding environment monitoring unit 20 and the camera unit 21), for example. In one example, the traveling control unit 22 may cause the own vehicle to travel along the target traveling course set on the basis of various kinds of information (e.g., the surrounding environment information) acquired by the traveling environment recognition unit 21d and the surrounding environment recognition unit 20b. The traveling control unit 22 may contribute to lane keeping assist control in which the own vehicle is controlled to keep traveling safely while keeping the current traveling lane.

For the purpose described above, the traveling control unit 22 may include a steering assist control unit 22a and a target traveling course setting unit 22b, for example.

The steering assist control unit 22a may perform control to assist the traveling control that involves steering operations out of various control operations to be performed by the traveling control apparatus 1 according to the example embodiment. For example, the steering assist control unit 22a may perform control to assist a driver's steering operation to cause the own vehicle to travel stably on the traveling lane and a driver's steering operation to avoid an unanticipated incident and a collision or contact with an obstacle on the traveling route during traveling of the own vehicle.

For example, the steering assist control unit 22a may perform the steering assist control as appropriate and as needed while the lane keeping assist control is executed to cause the own vehicle to travel along the set target traveling course.

The target traveling course setting unit 22b may set left and right imaginary target lines along respective inner edges of the left and right dividing lines of the own-vehicle traveling lane calculated on the basis of the information regarding the left and right dividing lanes retrieved from the surrounding environment information recognized by the traveling environment recognition unit 21d of the camera unit 21. Further, the target traveling course setting unit 22b may set a target traveling course at the middle of a region between the set imaginary target lines on the basis of the lane width data, for example.

Thereafter, the target traveling course setting unit 22b may recognize the region between the imaginary target lines as the own-vehicle traveling lane. The target traveling course extending in the middle of the recognized own-vehicle traveling lane may thus be set within the own-vehicle traveling lane, and may serve as an imaginary target traveling line along which the own vehicle is caused to travel under the lane keeping assist control.

Herein, the target traveling course may be a traveling route (traveling line) which is set within the own-vehicle traveling lane and along which the own vehicle is to travel. Thus, the term "target traveling course" used herein may refer to a traveling line which is a course or route in a narrower sense than the target traveling route defined as a route from the departure point to the destination via the waypoint.

Further, the traveling control unit 22 may perform a predetermined determination regarding various situations on the basis of the output information from the traveling environment recognition unit 21d and the surrounding environment recognition unit 20b of the surrounding environment monitoring unit 20 (i.e., the surrounding environment information acquisition device), various kinds of information obtained through the map locator calculator 12, and vehicle interior environment information acquired by the mode switch 33, the steering wheel touch sensor 34, the steering torque sensor 35, the brake sensor 36, and the accelerator sensor 37, for example. On the basis of the results of the determination, the traveling control unit 22 may control, for example, the engine control unit 23, the power steering control unit 24, and the brake control unit 25 to thereby perform the traveling control of the own vehicle.

In a case where the target traveling route set by the map locator calculator 12 includes an automatic driving section in which automated driving control is permitted to be executed, the traveling control unit 22 may set a traveling route along which the automatic driving control is to be performed within the automatic driving section. In the automatic driving section, the traveling control unit 22 may control, for example, the engine control unit 23, the power steering control unit 24, and the brake control unit 25 as appropriate to thereby cause the own vehicle to automatically travel along the target traveling route determined on the basis of the own vehicle position estimated from various kinds of information.

In a case where a preceding vehicle is detected during the automatic traveling of the own vehicle on the basis of the surrounding environment information recognized by the traveling environment recognition unit 21d, the traveling control unit 22 may cause the own vehicle to travel following the preceding vehicle by executing preceding vehicle following control or the lane keeping assist control, for example. In a case where no preceding vehicle is detected, the traveling control unit 22 may cause the own vehicle to travel at a set vehicle speed equal to or lower than a speed limit. Further, the traveling control unit 22 may execute selected steering assist control, such as the lane keeping assist control, lane deviation prevention control, or lane change control as appropriate. Depending on circumstances, the traveling control unit 22 may further perform traveling control to address an unusual condition of the driver.

As described above, the traveling control unit 22 may be coupled to various control units including the engine control unit 23, the power steering control unit 24, and the brake control unit 25 via the in-vehicle communication line 10. Thus, the traveling control unit 22 may control each of the control units including the engine control unit 23, the power steering control unit 24, and the brake control unit 25.

A throttle actuator 27 may be coupled to an output side of the engine control unit 23. The throttle actuator 27 may open and close a throttle valve of an electronic throttle of a throttle body of an engine. The throttle actuator 27 may regulate an intake air amount by opening or closing the throttle valve in accordance with a drive signal received from the engine control unit 23 to thereby generate a desired engine output.

An electronic power steering motor 28 may be coupled to an output side of the power steering control unit 24. The electronic power steering motor 28 may impart a steering torque to a steering mechanism using revolution power of an electric motor. In a driving mode other than a manual drive mode, the electronic power steering motor 28 may be operated in accordance with a drive signal received from the power steering control unit 24. Various kinds of steering assist control may be thereby executed to assist a steering operation. The steering torque sensor 35 may detect a change in driving amount of the electronic power steering motor 28 or the driving amount of the steering mechanism, for example, to thereby indicate a steering torque value.

A brake actuator 29 may be coupled to an output side of the brake control unit 25. The brake actuator 29 may adjust a hydraulic pressure to be supplied to a brake wheel cylinder of each wheel. When the brake actuator 29 is driven by a drive signal outputted from the brake control unit 25, the brake wheel cylinder may output a braking force to each wheel, forcibly decelerating the own vehicle.

Some or all of the map locator calculator 12, the surrounding environment recognition unit 20b, the traveling environment recognition unit 21d, the traveling control unit 22, the engine control unit 23, the power steering control unit 24, and the brake control unit 25 may be configured by a processor including hardware, for example.

The processor may be configured by: a known microcomputer including a central processing unit (CPU), a random access memory (RAM), a read only memory (ROM), a non-volatile memory, a non-volatile storage, and a non-transitory computer readable medium; and peripheral devices, for example.

The ROM, the non-volatile memory, and the non-volatile storage may preliminarily store fixed data such as software programs to be executed by the CPU or data tables, and specific information regarding the own vehicle such as vehicle size data. The CPU may read the software program stored in the ROM, for example, and develop and execute the program in the RAM. The software program may refer to various kinds of data as appropriate to thereby implement operations of the above-described constituting component and the constituting units (the map locator calculator 12, the surrounding environment recognition unit 20b, the traveling environment recognition unit 21d, the traveling control unit 22, the engine control unit 23, the power steering control unit 24, and the brake control unit 25).

Alternatively, the processor may be configured by a semiconductor chip such as a field programmable gate array (FPGA). The above-described constituting component and the constituting units (the map locator calculator 12, the surrounding environment recognition unit 20b, the traveling environment recognition unit 21d, the traveling control unit 22, the engine control unit 23, the power steering control unit 24, and the brake control unit 25) may be each configured by electronic circuitry, for example.

Part of or the entirety of the software program may be stored in a computer program product. Examples of the computer program product may include a portable disc medium such as a flexible disk, a CD-ROM, or a DVD-ROM, or a non-transitory computer readable medium such as a card memory, a hard disk drive (HDD), or a solid state drive (SSD). The schematic configuration of the traveling control apparatus 1 according to the example embodiment has been described above.

Figure 2:
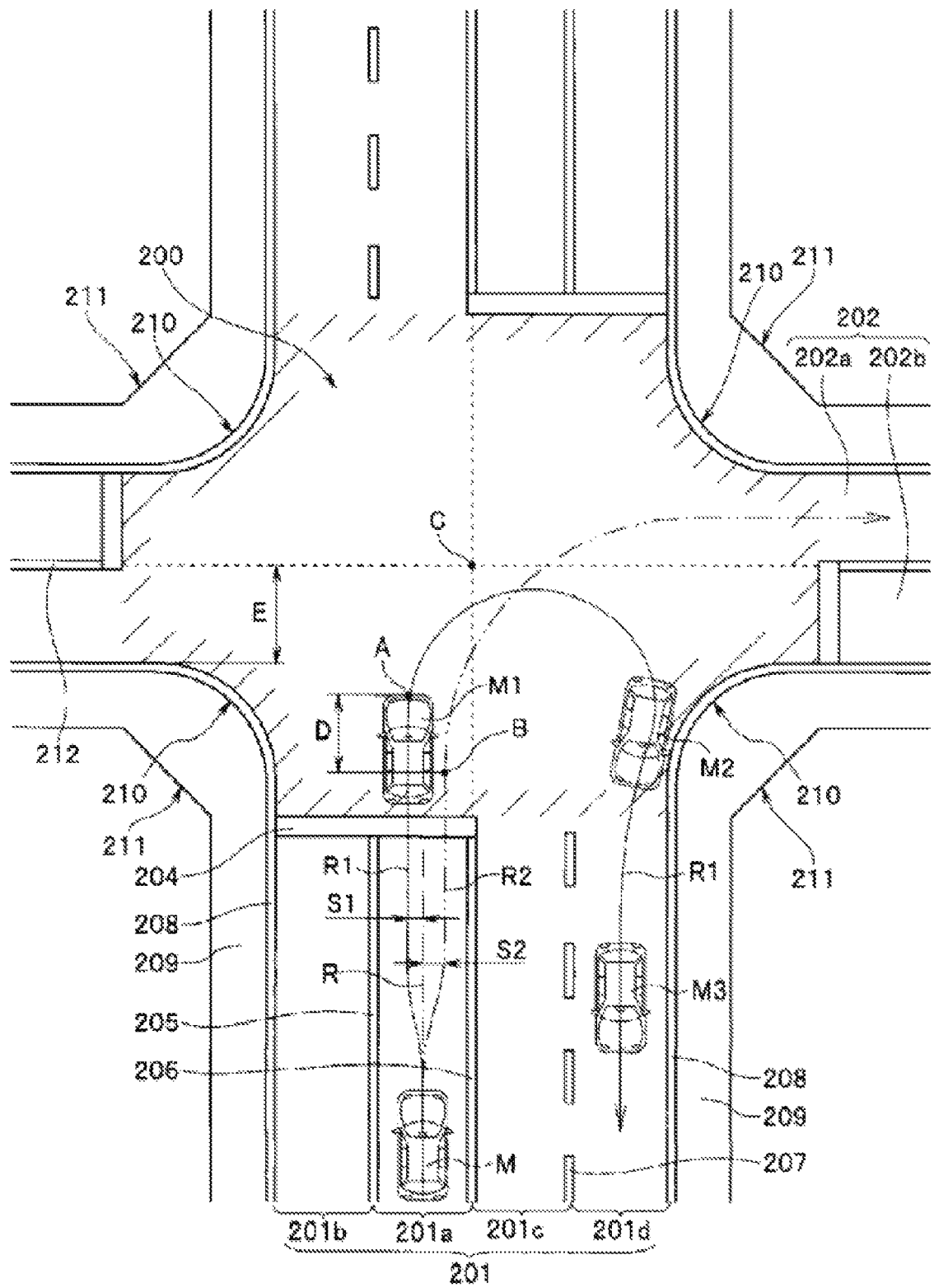
FIG. 2 is a conceptual diagram illustrating an exemplary operation of an own vehicle in intersection U-turn traveling control performed by the traveling control apparatus according to one example embodiment of the disclosure.
Figure 3:
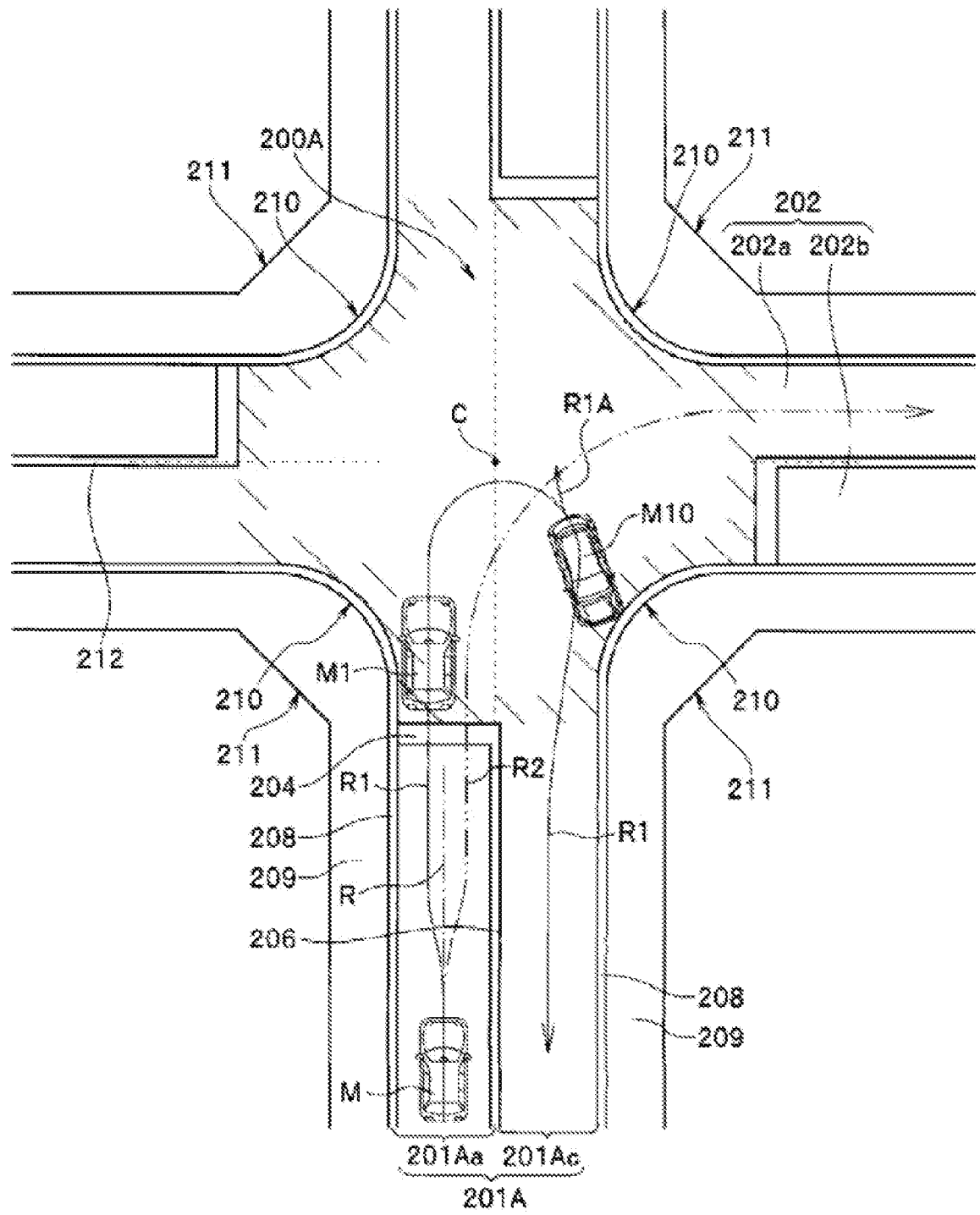
FIG. 3 is a conceptual diagram illustrating an exemplary operation of the own vehicle in the intersection U-turn traveling control performed by the traveling control apparatus according to one example embodiment of the disclosure in a case where a preceding vehicle performing U-turn travel is detected.
Figure 4:
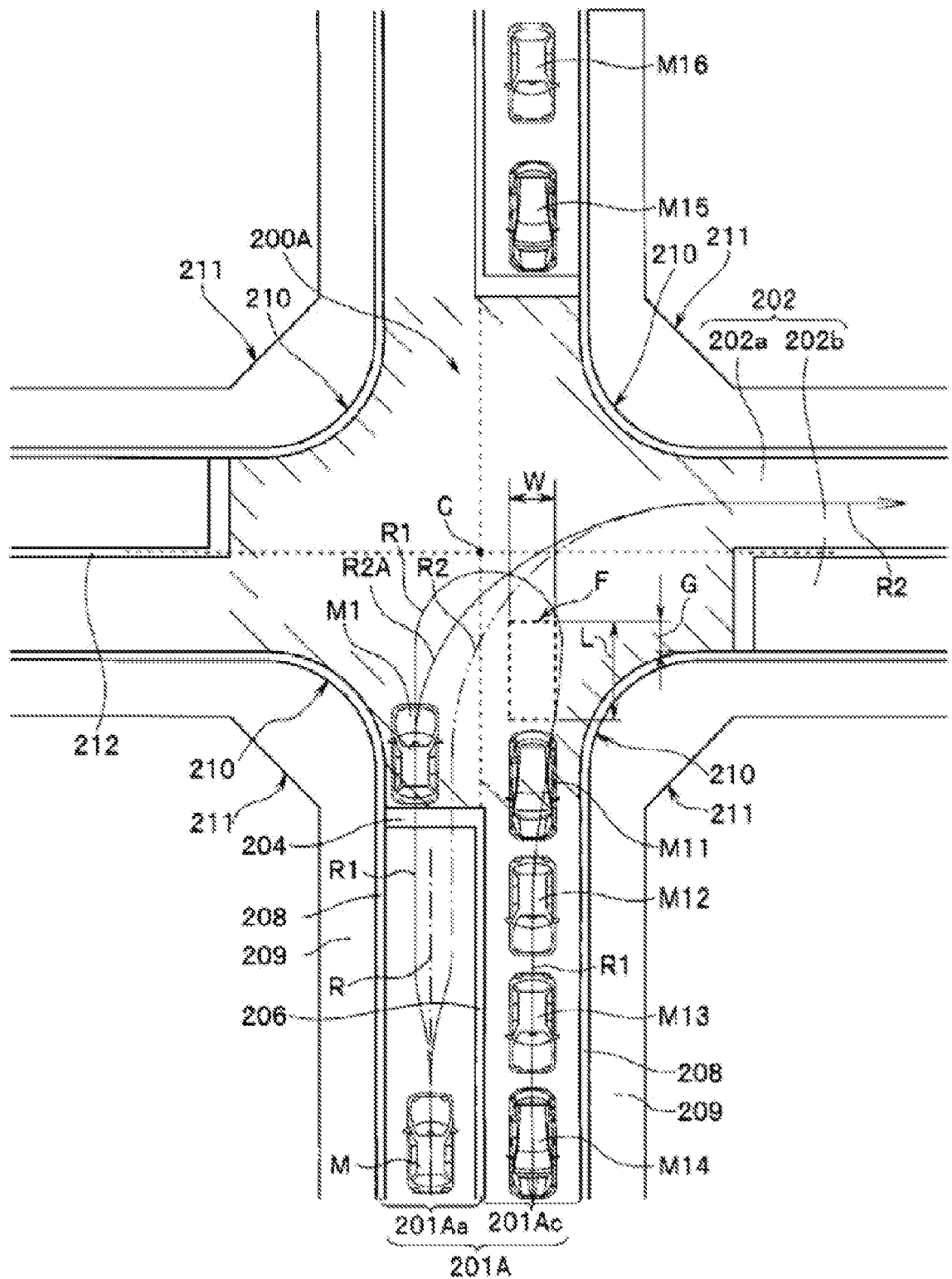
FIG. 4 is a conceptual diagram illustrating an exemplary operation performed by the own vehicle in a case where traveling control apparatus according to one example embodiment of the disclosure switches the intersection U-turn traveling control to right-turn traveling control in an intersection in which the intersection U-turn traveling control is scheduled to be performed.

Exemplary operations of the traveling control apparatus 1 according to an example embodiment having the above-described configuration will now be described. FIGS. 2 to 4 illustrate exemplary operations of the traveling control apparatus according to the example embodiment. FIG. 2 is a conceptual diagram illustrating an exemplary operation of the own vehicle in the intersection U-turn traveling control performed by the traveling control apparatus 1. FIG. 3 is a conceptual diagram illustrating an exemplary operation of the own vehicle in the intersection U-turn traveling control performed by the traveling control apparatus 1 in a case where a preceding vehicle performing the U-turn travel is detected. FIG. 4 is a conceptual diagram illustrating an exemplary operation of the own vehicle performed in a case where the traveling control apparatus 1 switches the intersection U-turn traveling control to right-turn traveling control in the intersection in which the intersection U-turn traveling control is scheduled to be performed. Note that the term "U-turn" used herein may refer to a turning movement of a vehicle in a direction opposite to a current traveling direction on the same road, that is, to an oncoming lane.

The following description of the example embodiment is made on the basis of a road system in which the own vehicle keeps left following a left-hand traffic regulation. Thus, the configuration according to the example embodiment of the disclosure is easily applied to a right-hand traffic system by simply inverting left and right.

First, exemplary situations illustrated in FIGS. 2 to 4 are described. In FIGS. 2 to 4, reference numerals M, M1, M2, and M3 each indicates the own vehicle on which the traveling control apparatus 1 according to the example embodiment is mounted. Although described in detail below, reference numerals M, M1, M2, and M3 each indicates the own vehicle before entering an intersection 200 in which U-turn travel is scheduled to be performed. In FIGS. 2 to 4, reference numeral M1 indicates the own vehicle which starts steering for the U-turn travel after entering the intersection 200. In FIG. 2, reference numeral M2 indicates the own vehicle which is in the middle of the U-turn travel. In FIG. 2, reference numeral M3 indicates the own vehicle which has completed the U-turn travel.

In FIG. 3, reference numeral M10 indicates a preceding vehicle traveling immediately in front of the own vehicle and performing the U-turn travel in the intersection 200. In this example, the preceding vehicle M10 fails to complete the U-turn travel in one steering operation and almost come into contact with a corner 210. Thus, the preceding vehicle M10 will move backward in a distance R1A and then move forward (i.e., perform a three-point turn which will be described in detail later).

In FIG. 4, reference numerals M11 to M16 indicate other vehicles on an oncoming lane. Among them, reference numerals M11 to M14 indicate other vehicles on the oncoming lane which have passed through the intersection 200. Reference numerals M15 and M16 indicate other vehicles which have not entered the intersection 200 yet.

The own vehicle travels on an own-vehicle traveling road 201 illustrated in FIG. 2 and an own-vehicle traveling road 201A illustrated in FIGS. 3 and 4. The own-vehicle traveling road 201 illustrated in FIG. 2 has two lanes in one direction (i.e., four lanes in both directions). The own vehicle travels on an own-vehicle traveling lane 201a. The own-vehicle traveling lane 201a is adjacent to the middle of the own-vehicle traveling road 201. A traveling lane 201b is adjacent to the own-vehicle traveling lane 201a. Oncoming lanes 201c and 201d extend in a direction opposite to that of the own-vehicle traveling lane 201a. The oncoming lane 201c is a passing lane adjacent to the middle of the own-vehicle traveling road 201. The oncoming lane 201d is a traveling lane adjacent to a road shoulder.

The own-vehicle traveling road 201A illustrated in FIGS. 3 and 4 has one lane in one direction (i.e., two lanes in both directions). The own vehicle travels on an own-vehicle traveling lane 201Aa. An oncoming lane 201Ac extends in a direction opposite to that of the own-vehicle traveling lane 201Aa.

The own-vehicle traveling roads 201 and 201A each intersect with a cross road 202 as illustrated in FIGS. 2 to 4. In the examples illustrated in FIGS. 2 to 4, the cross road 202 has one lane in one direction. In a case where the own vehicle traveling on the own-vehicle traveling road 201 or 201A turns right to enter the cross road 202, the own vehicle travels on a traveling lane 202a. A lane 202b is an oncoming lane extending in a direction opposite to that of the traveling lane 202a. A center dividing line 212 extends in the middle of the cross road 202.

The own-vehicle traveling road 201 intersects with the cross road 202 at the intersection 200, and the own-vehicle traveling road 201A intersects with the cross road 202 at an intersection 200A, as illustrated in FIGS. 2 to 4. Each of the intersections 200 and 200A is an inner region surrounded by hatching, as illustrated in FIGS. 2 to 4, for example. The intersections 200 and 200A may each have a central position C.

In the examples illustrated in FIGS. 2 to 4, road marks 204, 205, 206, and 207 are provided. The road mark 204 is a stop line provided before the intersection 200 or 200A. The road mark 205 illustrated only in FIG. 2 is a dividing line or a borderline between the own-vehicle traveling lane 201a and the traveling lane 201b. The road mark 206 is a center line or a median strip which is a dividing line indicating a central boundary of the own-vehicle traveling road 201 (hereinafter simply referred to as a center line). The road mark 207 illustrated only in FIG. 2 is a dividing line indicating a boundary between the oncoming lanes 201c and 201d.

In the examples illustrated in FIGS. 2 to 4, sidewalks 209 are provided on both sides of the own-vehicle traveling roads 201 and 201A and both sides of the cross road 202. A curbstone 208 is provided at a boundary between the sidewalk 209 and each of the own-vehicle traveling roads 201 and 201A and the cross road 202, for example.

The intersections 200 and 200A each have corners 210. The corners 210 are portions corresponding to corner cutouts 211 defined by the own-vehicle traveling road 201 and the cross road 202 intersecting with each other.

A dashed-dotted line in FIGS. 2 to 4 represents an imaginary line R (hereinafter referred to as a lane center imaginary line R) indicating a substantially middle position of the own-vehicle traveling lane 201a defined by the left and right dividing lines (the road marks 205 and 206 in the example illustrated in FIG. 2, or the road marks 206 and 208 in the examples illustrated in FIGS. 3 and 4).

A thin solid line in FIG. 2 represents a target traveling course R1 along which the intersection U-turn traveling control is to be executed in the intersection 200. A dashed-two dotted line in FIG. 2 represents a target traveling course R2 to be set in ordinary right-turn traveling control in the intersection 200, that is, traveling control causing the own vehicle to cross the oncoming lane at the intersection 200 to enter the cross road 202.

First, an exemplary operation of the own vehicle in the intersection U-turn traveling control is schematically described with reference to FIG. 2. In the example illustrated in FIG. 2, the own vehicle may travel on the own-vehicle traveling lane 201a of the own-vehicle traveling road 201 under the traveling control in an automatic drive mode.

Herein, the automatic drive mode may refer to a drive mode in which traveling control is executed to cause a vehicle to automatically travel along a predetermined target traveling route. To execute the traveling control in the automatic drive mode, the driver or the occupant may input a desired destination (including a waypoint, etc.) to the traveling control apparatus 1 of the own vehicle using the route information input unit 19 before starting travel (departure) of the own vehicle. On the basis of the input information, the traveling control apparatus 1 may set an appropriate target traveling route from the departure point to the destination via the waypoint, for example.

During the traveling control in the automatic drive mode, the traveling control apparatus 1 may recognize the left and right dividing lines of the own-vehicle traveling lane and set the target traveling course at a substantially middle position between the recognized left and right dividing lines. Thereafter, the traveling control apparatus 1 may perform control to cause the own vehicle to travel along the set target traveling course while causing the own vehicle to travel along the target traveling route set before the start of travel (departure) of the own vehicle.

A situation may arise where the intersection 200 in which the U-turn travel is scheduled to be performed is present in front of the own vehicle traveling in the automatic drive mode. FIG. 2 illustrates the own vehicle M before entering the intersection 200. In this case, the traveling control apparatus 1 of the own vehicle may recognize the road marks (left and right dividing lines) 205 and 206 of the own-vehicle traveling lane 201a, set the target traveling course at the substantially middle position (i.e., on the lane center imaginary line R) between the recognized road marks (left and right dividing lines) 205 and 206, and perform traveling control to cause the own vehicle to travel along the lane center imaginary line R.

When the own vehicle comes closer to the intersection 200, the traveling control apparatus 1 may recognize that the intersection 200 corresponds to an intersection in which the U-turn travel is schedule to be performed. Upon the recognition, the traveling control apparatus 1 may start the intersection U-turn traveling control. In the intersection U-turn traveling control, the target traveling course R1 suitable for the U-turn travel within the intersection 200 may be set, and the own vehicle may be caused to travel along the target traveling course R1.

A schematic processing sequence of the intersection U-turn traveling control is as follows. First, a left-shifted course may be set along which the own vehicle is shifted leftward with respect to a traveling direction (i.e., in a direction opposite to a U-turn direction) before entering the intersection 200 in which the U-turn travel is scheduled to be performed. Thereafter, a steering start point at which steering control for the U-turn travel is to be started after the own vehicle enters the intersection 200 and a steering speed may be set. After the U-turn travel is started, a steering angle (steering amount) may be set at a maximum steering angle (a maximum steering amount). In this manner, the target traveling course R1 illustrated in FIG. 2 may be set.

Part of the target traveling course R1 set before the intersection 200 may extend within the own-vehicle traveling lane 201a. Accordingly, the own vehicle may be controlled to keep traveling within the own-vehicle traveling lane 201a before entering the intersection 200. Within the own-vehicle traveling lane 201a, the target traveling course R1 may be shifted more leftward than the target traveling course R2 to be set in the ordinary right-turn traveling control. In the example illustrated in FIG. 2, the target traveling course R1 may be set at a position shifted leftward from the lane center imaginary line R by a predetermined distance S1 in the traveling direction.

The left-shifted course set in the intersection U-turn traveling control may include a stop position at which the own vehicle makes a temporary stop after entering the intersection 200 and before starting the U-turn travel to wait for an oncoming vehicle to pass through the intersection 200, for example. Thus, part of the target traveling course R1 extending in the intersection 200 may be set within an extended range of the own-vehicle traveling lane 201a in the traveling direction. Accordingly, even if the own vehicle makes a temporary stop within the intersection 200 during the intersection U-turn travel to wait for an oncoming vehicle to pass through the intersection 200, for example, the own vehicle will not hinder traffic flow.

In general, in the ordinary right-turn traveling control at an intersection, the target traveling course R2 may be set as illustrated in FIG. 2, for example. The target traveling course R2 may be shifted rightward from the lane center imaginary line R (i.e., shifted toward the road mark 206 which is the center line) by a predetermined distance S2 as illustrated in FIG. 2. Also in this case, the target traveling course R2 may be set within the own-vehicle traveling lane.

Thereafter, a predetermined steering start point (e.g., a steering start point B illustrated in FIG. 2) within the intersection 200, a steering speed, and a steering angle (steering amount) may be set. The steering speed and the steering angle (steering amount) may be set as appropriate on the basis of the dimensions of the intersection 200 (e.g., the region defined by the width of the own-vehicle traveling road 201 and the width of the cross road 202).

When the traveling control is executed along the route set as described above at the steering timing set as described above, the own vehicle may travel along an arc-shaped traveling course (i.e., a so-called clothoid curve) extending along an inner side of the central position C of the intersection 200, and may thereafter travel along the lane center imaginary line on the traveling lane 202a of the cross road 202 (see the target traveling course R2).

In contrast, in the intersection U-turn traveling control, the route set before the intersection 200 is shifted more leftward than the target traveling course R2 to be set in the ordinary right-turn traveling control, as described above. That is, the route set before the intersection 200 in the intersection U-turn traveling control is shifted in a direction opposite to the U-turn direction.

In addition, in the intersection U-turn traveling control, the steering start point is set at a position farther from the own vehicle in the traveling direction than the steering start point to be set in the ordinary right-turn traveling control is. That is, the steering start timing in the intersection U-turn traveling control is later than the steering start timing in the ordinary right-turn traveling control.

For example, as illustrated in FIG. 2, in a case where the steering start point B is set in the ordinary right-turn traveling control, a steering start point A may be set in the intersection U-turn traveling control. In this case, the steering start point A set in the intersection U-turn traveling control may be shifted by an amount D in distance or time from the steering start point B set in the ordinary right-turn traveling control.

Setting the steering start timing in the intersection U-turn traveling control at a timing later than the steering start timing in the ordinary right-turn traveling control as described above makes it possible to reduce the possibility of contact of the own vehicle with the corner 210 of the oncoming lane 201d extending in the U-turn direction. Accordingly, it is possible for the own vehicle to smoothly complete the U-turn travel without performing the three-point turn during the U-turn travel.

The target traveling course R1 for the intersection U-turn traveling control may be set as follows. First, the traveling control apparatus 1 may recognize dimension information of the intersection 200 on the basis of various kinds of information (e.g., the surrounding environment information and the map information) acquired by the surrounding environment information acquisition device (i.e., the surrounding environment monitoring unit 20 and the camera unit 21) and the locator unit 11. The dimension information of the intersection 200 may be, for example, the vertical and horizontal dimensions of the inner region surrounded by the hatching illustrated in FIG. 2. In one example, the traveling control apparatus 1 may refer to the width of the own-vehicle traveling road 201 and the width of the cross road 202. On the basis of the dimension information of the intersection 200 acquired in this manner and specific information of the own vehicle (e.g., vehicle size information such as the width of the own vehicle), the traveling control apparatus 1 may calculate an appropriate lateral movement amount (i.e., the predetermined distance S1) of the own vehicle traveling within the own-vehicle traveling lane 201a. In addition, the steering start point A may be set on the basis of the recognized dimension information of the intersection 200.

In general, the dimension information of the intersection 200 may be defined by the width of the own-vehicle traveling road 201 and the width of the cross road 202. A region available for the U-turn travel within the intersection 200 (hereinafter referred to as a U-turn travel region) may be set as follows in general: the U-turn travel region may be a region defined by a predetermined part of the entire width of the own-vehicle traveling road 201 in the lateral direction (width direction) and a width E in the longitudinal direction (traveling direction) (i.e., the width of the lane 202b of the cross road 202) as illustrated in FIG. 2.

A reason why the width of the U-turn travel region in the longitudinal direction is defined as the width E may be that, when performing the U-turn travel within the intersection, the own vehicle has to be prevented from projecting forward through the central position C of the intersection to avoid contact with another vehicle entering the intersection 200 from in front of the own vehicle and turning right, for example.

Thus, in the case of the own-vehicle traveling road 201 having two lanes in one direction (i.e., four lanes in both directions) as illustrated in FIG. 2, for example, the U-turn travel region may be defined by: the total width of the width of the own-vehicle traveling lane 201a, the width of the oncoming lane 201c, and the width of the oncoming lane 201d in the lateral direction; and the width of the lane 202b of the cross road 202 in the longitudinal direction.

In the case of the own-vehicle traveling road 201A having one lane in one direction (i.e., two lanes in both directions) as illustrated in FIGS. 3 and 4, for example, the U-turn travel region may be defined by: the entire width of the own-vehicle traveling road 201A in the lateral direction; and the width of the lane 202b of the cross road 202 in the longitudinal direction.

As described above, in the dimension information of the intersection 200, the U-turn travel region may be a limited region with respect to the entire dimensions of the intersection 200. Accordingly, as the width of the own-vehicle traveling road 201 or the width of the cross road 202 becomes narrower, part of the target traveling course R1 set before the intersection 200 may be shifted leftward by a larger distance in the intersection U-turn traveling control. The distance by which the part of the target traveling course R1 set before the intersection 200 is shifted leftward may be substantially linearly proportional to the dimensions of the intersection 200.

In addition, as the width of the own-vehicle traveling road 201 or the width of the cross road 202 becomes narrower, the steering start timing in the intersection U-turn traveling control may be set to a later timing, i.e., the steering start point may be set at a position farther from the own vehicle in the traveling direction. Setting the steering start timing at a later timing in the intersection U-turn traveling control as the width of the own-vehicle traveling road 201 or the width of the cross road 202 becomes narrower makes it possible to reduce the possibility of contact of the own vehicle with the corner 210 of the oncoming lane 201d. Accordingly, it is possible for the own vehicle to smoothly complete the U-turn travel without performing the three-point turn during the U-turn travel.

As the steering start timing is set at a later timing (i.e., as the steering start point is set at a position farther from the own vehicle in the traveling direction), the steering speed may be set to a higher speed. As the steering start timing is set at a later timing (i.e., as the steering start point is set at a position farther from the own vehicle in the traveling direction), the U-turn travel region may tend to become narrower in the traveling direction (longitudinal direction). Thus, the steering speed may be set at a higher speed to prevent the own vehicle from projecting forward through the central position C of the intersection in the traveling direction. Accordingly, it is possible for the own vehicle to smoothly complete the U-turn travel.

Note that the steering start timing in the intersection U-turn traveling control may also be set substantially linearly proportional to the dimensions of the intersection.

When the intersection U-turn traveling control is executed along the target traveling course R1 set as described above at the steering timing (the steering start point A) set as described above, the own vehicle may perform the U-turn travel along the arc-shaped traveling course (a so-called clothoid curve) extending along the inner side of the central position C of the intersection 200 to thereby complete the U-turn travel without contacting with the corner 210 of the intersection 200. Thereafter, the own vehicle may continue to travel along the lane center imaginary line on the oncoming lane 201d of the own-vehicle traveling road 201 (see the target traveling course R1).

Note that the lane 201d in FIG. 2 may be an oncoming lane before the U-turn travel is started as described above, whereas the lane 201d may be an own-vehicle traveling lane after the U-turn travel is completed. However, the lane 201d may be herein referred to as the oncoming lane 201d for convenience of explanation.

In the intersection U-turn traveling control, the traveling control may be performed at a constant vehicle speed of ten kilometers per hour, for example.

In a case where the own vehicle traveling in the automatic drive mode enters the intersection in which the U-turn travel is schedule to be performed and where another vehicle traveling immediately in front of the own vehicle (hereinafter referred to as a preceding vehicle) also performs the U-turn travel in the intersection, the preceding vehicle may fail to complete the U-turn travel and thus move backward and then move forward (i.e., perform the three-point turn).

For example, in a case where the preceding vehicle (M10 in FIG. 3) immediately in front of the own vehicle enters the intersection 200A and performs the U-turn travel, the preceding vehicle may fail to complete the U-turn travel in one steering operation. In such a case, the preceding vehicle M10 may almost come into contact with the corner 210 of the intersection 200A and may be hindered from moving forward as illustrated in FIG. 3. In this case, the preceding vehicle M10 may perform a driving operation to move backward once in a predetermined distance R1A in FIG. 3 and thereafter move forward along the target traveling course R1 in FIG. 3 (i.e., the preceding vehicle M10 may perform the three-point turn).

In view of such a situation, the traveling control apparatus 1 according to the example embodiment may set a larger inter-vehicle distance between the preceding vehicle and the own vehicle than a usual inter-vehicle distance in a case where the preceding vehicle performing the U-turn travel is recognized. In this case, the inter-vehicle distance may be set to a distance enough to avoid the contact between the preceding vehicle and the own vehicle traveling following the preceding vehicle even if the preceding vehicle moves backward.

The inter-vehicle distance may be set on the basis of dimension information of the intersection 200A in which the U-turn travel is scheduled to be performed. As the U-turn travel region recognized on the basis of the dimension information of the intersection 200A (e.g., the region defined by the width of the own-vehicle traveling road 201A and the width of the cross road 202) becomes narrower, the possibility that the preceding vehicle moves backward and then moves forward (i.e., performs the three-point turn) during U-turn travel may increase. Thus, as the U-turn travel region recognized on the basis of the dimension information of the intersection 200A becomes narrower, the inter-vehicle distance may become larger.

Such traveling control makes it possible for the traveling control apparatus 1 according to the example embodiment to secure safety traveling while avoiding contact between the preceding vehicle and the own vehicle traveling following the preceding vehicle even if the preceding vehicle moves backward and then moves forward (i.e., performs the three-point turn) during the U-turn travel.

Another situation may arise where traffic congestion is generated on the oncoming lane 201Ac as illustrated in FIG. 4, for example, when the own vehicle traveling in the automatic drive mode enters the intersection in which the U-turn travel is scheduled to be performed. In this situation, there may be no or little space on the oncoming lane 201Ac which the own vehicle is to enter after completing the U-turn travel.

The situation where there is no or little space which the own vehicle is to enter after completing the U-turn travel may be as follows. A situation may arise where, when the own vehicle tries to enter the oncoming lane 201Ac after completing predetermined U-turn travel in the intersection 200A, preceding vehicles are temporarily stopping on the oncoming lane 201Ac due to traffic congestion on the oncoming lane 201Ac. In this case, the own vehicle may temporarily stop following the preceding vehicle M11 at the tail of the preceding vehicles on the oncoming lane 201Ac. Depending on the position at which the own vehicle makes a temporary stop, a part of a rear portion of the own vehicle may remain within the region of the cross road 202.

For example, the own vehicle may enter an imaginary region (hereinafter referred to as a post U-turn own vehicle region F) after completing the U-turn travel, as illustrated in FIG. 4. The post U-turn own vehicle region F may be a rectangular region having a width W substantially the same as the width of the own vehicle and a length L substantially the same as the entire length of the own vehicle.

In a case where traffic congestion is generated on the oncoming lane 201Ac and where multiple preceding vehicles M11 to M14 are each making a temporary stop on the oncoming lane 201Ac, a part of the post U-turn own vehicle region F may intrude into the intersection 200A. That is, in this case, a part of the rear portion of the own vehicle may remain in the intersection 200A even after the own vehicle completes the U-turn travel.

In one example illustrated in FIG. 4, the post U-turn own vehicle region F may be included in the intersection 200A (the inner region surrounded by hatching in FIG. 4). In other words, in the example illustrated in FIG. 4, a part of the post U-turn own vehicle region F may intrude into an extended region of the cross road 202 by a distance G.

Note that the inner region of the intersection 200A may be a rectangular region surrounded by extended lines along opposite road shoulders of the own-vehicle traveling road 201A and extended lines along opposite road shoulders of the cross road 202. In general, parking and stopping are prohibited in an intersection and a predetermined peripheral region around the intersection (corresponding to the region surrounded by hatching in FIG. 4). As in the example illustrated in FIG. 4, in a case where the own vehicle makes a temporary stop and where a portion of the own vehicle projects into the extended region of the cross road 202, the own vehicle will hinder the travel of other vehicles on the cross road 202.

As described above, in a case where the own vehicle performs the U-turn travel in the intersection 200A and thereafter stops in the post U-turn own vehicle region F due to the traffic congestion generated on the oncoming lane 201Ac, for example, the own vehicle will hinder the travel of other vehicles on the cross road 202 depending on the stop position of the own vehicle.

In view of such a situation, the traveling control apparatus 1 according to the example embodiment may confirm whether a sufficient region which the own vehicle is to enter (i.e., the post U-turn own vehicle region F) is secured on the oncoming lane 201Ac before the own vehicle performs the U-turn travel. Further, the traveling control apparatus 1 may execute the U-turn travel only if the sufficient region is secured for the own vehicle after the completion of the U-turn travel. In contrast, if the sufficient region is not secured for the own vehicle after the completion of the U-turn travel (i.e., the post U-turn own vehicle region F is not secured), the traveling control apparatus 1 may switch the scheduled intersection U-turn traveling control to the right-turn traveling control. In this case, all of the control for the automatic driving (e.g., the target traveling course, the acceleration and deceleration control, and the steering control) may be immediately switched to the right-turn traveling control. Further, in view of such a situation (where traffic congestion is generated in the surrounding environment of the own vehicle), the traveling control apparatus 1 may perform acceleration control at a lower acceleration speed than that in the ordinary right-turn travel after switching the intersection U-turn traveling control to the right-turn traveling control.

In a case where traffic congestion has been generated on the oncoming lane 201Ac, a situation may arise where the other vehicle M15 on the oncoming lane 201Ac and going to enter the intersection 200A from in front of the own vehicle gives up passing straight through the intersection and turns left to avoid the traffic congestion, for example. In this case, the other vehicle M15 may turn left from the oncoming lane 201Ac and enter the traveling lane 202a. In this case, if the own vehicle turns right by switching the traveling control and enters the traveling lane 202a of the cross road 202, the other vehicle and the own vehicle may travel on the same traveling lane, i.e., the traveling lane 202a of the cross road 202. Accordingly, there is a possibility of contact between the own vehicle making the right turn and the other vehicle making the left turn.

Another situation may arise where the other vehicle M15 on the oncoming lane 201Ac passes through the intersection 200A from in front of the own vehicle, and is forced to advance straight because of, for example, switching of a traffic light (e.g., switching from a green signal to a red signal) even though the sufficient region is not secured for some reasons including traffic congestion. In this case, there is a possibility of contact between the own vehicle making the right turn and the other vehicle M15 advancing straight.

In view of such a situation, after switching the intersection U-turn traveling control to the right-turn traveling control due to the traffic congestion, the traveling control apparatus 1 may execute the acceleration control of the own vehicle at a lower acceleration speed to avoid contact with another vehicle, for example. Accordingly, it is possible to secure further safety traveling.

In general, in the intersection U-turn traveling control, the vehicle speed of the own vehicle may be set to a lower speed than that in the ordinary right-turn traveling control, for example. Thus, when the scheduled U-turn traveling control is switched to the right-turn traveling control, the acceleration control of the own vehicle may be performed at a lower acceleration speed. Accordingly, it is possible to achieve safe and smooth control switching without making the driver feel anxious or strange.

As described above, in a case where the traveling control apparatus 1 recognizes the intersection 200A in which the U-turn traveling control is scheduled to be performed, traffic congestion generated on the oncoming lane, and an absence of a region on the oncoming lane 201Ac (the traveling lane on which the own vehicle travels after completing the U-turn traveling control) which the own vehicle is to enter after completing the U-turn travel, the traveling control apparatus 1 may switch the scheduled U-turn traveling control to the right-turn traveling control. In this case, before the U-turn traveling control is switched to the right-turn traveling control, e.g., from a time point before the own vehicle enters the intersection 200A to a time point immediately after the own vehicle enters the intersection 200A, the traveling control may be performed along the target traveling course R1 illustrated in FIG. 4. The own vehicle may travel from the position of the own vehicle indicated with M illustrated in FIG. 4 along the target traveling course R1, enter the intersection 200A, and reach the position of the own vehicle indicated with M1 illustrated in FIG. 4, for example.

If the U-turn traveling control is switched to the right-turn traveling control, the traveling control of the own vehicle indicated with M in FIG. 4 may be switched from the traveling control along the target traveling course R1 to the traveling control along the target traveling course R2A. The target traveling course R2A may be an arc-shaped course (a so-called clothoid curve) extending from the position of the own vehicle indicated with M1 in FIG. 4 along the inner side of the central position C of the intersection 200A and eventually merging with the target traveling course R2 for the ordinary right-turn traveling control. That is, after completing the right-turn traveling control, the own vehicle may travel along the course at a substantially middle position of the traveling lane 202a of the cross road 202. During the travel on the traveling lane 202a, the acceleration control may be performed at a lower acceleration speed than that of the ordinary right-turn traveling control in view of the surrounding environment (e.g., a traffic congestion condition).

Through the control described above, it is possible to perform smooth traveling control without making the driver feel strange or anxious even if the scheduled intersection U-turn traveling control is switched to the right-turn traveling control in accordance with an actual in-situ condition (e.g., the traffic congestion condition).

Now, the intersection U-turn traveling control performed by the traveling control apparatus 1 according to the example embodiment is described with reference to flowcharts illustrated in FIGS. 5 and 6.

First, as described above, the own vehicle on which the traveling control apparatus 1 according to the example embodiment is mounted may travel on the own-vehicle traveling road 201 illustrated in FIG. 2, for example, under the traveling control in the automatic drive mode.

Note that the following description may also be applied to the case where the own vehicle travels on the own-vehicle traveling lane 201Aa of the own-vehicle traveling road 201A illustrated in FIGS. 3 and 4. Exemplary operations in the intersection U-turn traveling control are described below with reference to FIG. 2. Among various kinds of sequences executed during the intersection U-turn traveling control of the own vehicle, exemplary operations performed when a preceding vehicle performing the U-turn travel is detected are described with reference to FIG. 3. Further, exemplary operations performed when the own vehicle switches the intersection U-turn traveling control to the right-turn traveling control, for example, are described with reference to FIG. 4.

Figure 5:
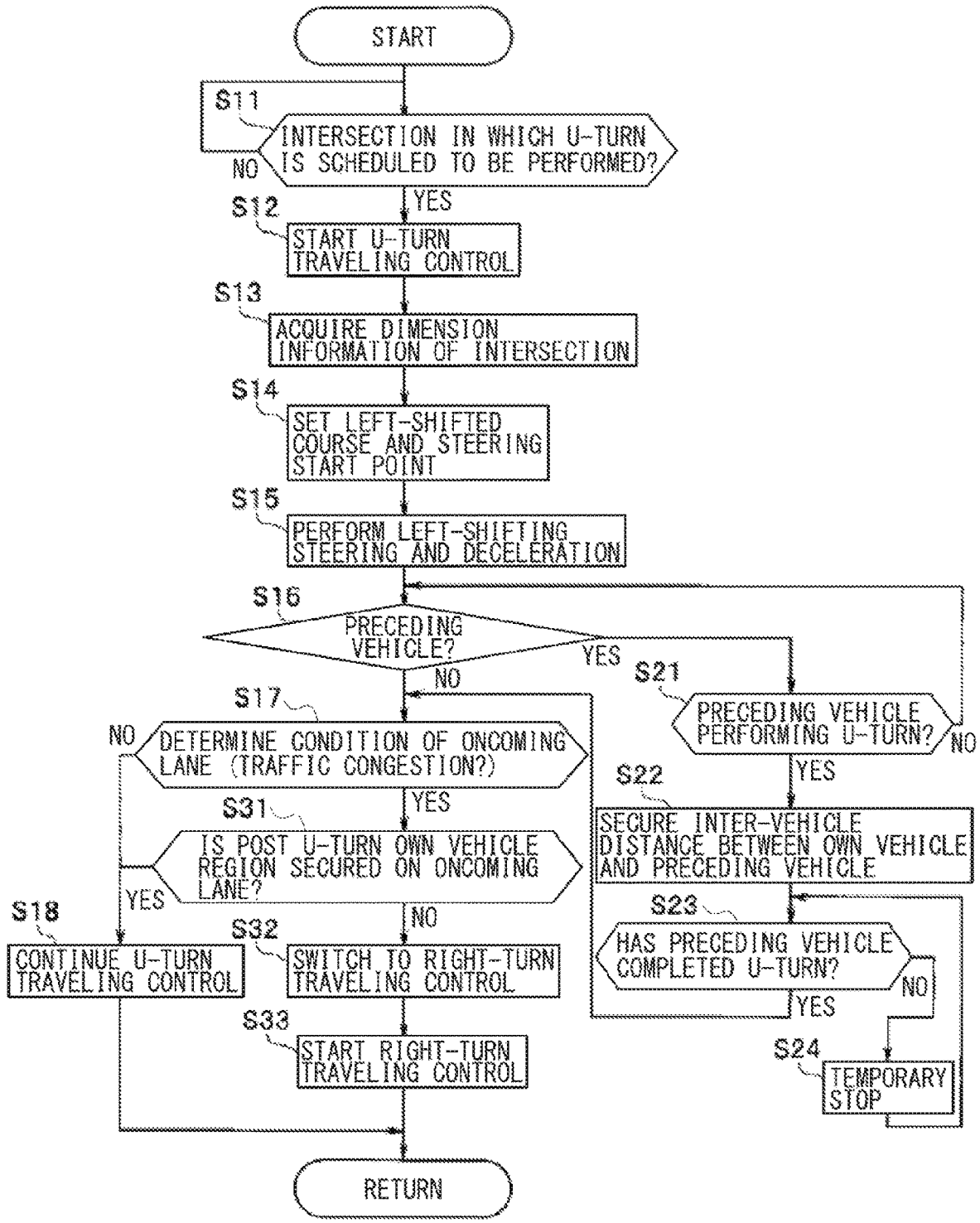
FIG. 5 is a flowchart of an exemplary procedure of the intersection U-turn traveling control to be performed by the traveling control apparatus according to one example embodiment of the disclosure.

In this example, the traveling control apparatus 1 of the own vehicle traveling in the automatic drive mode may determine in Step S11 in FIG. 5 whether an intersection in which the U-turn travel is scheduled to be performed is recognized on the set target traveling route and in front of the own vehicle in the traveling direction. If the intersection in which the U-turn travel is scheduled to be performed is recognized (Step S11: YES), the procedure may proceed to Step S12. If the intersection in which the U-turn travel is scheduled to be performed is not recognized in front of the own vehicle in the traveling direction (Step S11: NO), the determination at Step S11 may be repeated until the intersection is recognized. However, the sequence illustrated in FIG. 5 is simplified, and actually, the traveling control apparatus 1 may also execute the traveling control along the set target traveling route while repeating the determination at Step S11.

In Step S12, the traveling control apparatus 1 may start the intersection U-turn traveling control.

Thereafter, in Step S13, the traveling control apparatus 1 may acquire the dimension information of the intersection 200 on the basis of various pieces of information such as the surrounding environment information and the map information acquired by the surrounding environment information acquisition device (i.e., the surrounding environment monitoring unit 20 and the camera unit 21) and the locator unit 11, for example.

In Step S14, the traveling control apparatus 1 may set the left-shifted course and the steering start point on the basis of the dimension information of the intersection acquired in Step S13 described above.

In Step S15, the traveling control apparatus 1 may execute left-shifting steering control which is traveling control along the left-shifted course set in Step S14 described above. At the same time, the traveling control apparatus 1 may perform deceleration control. Although not illustrated, in a case where the intersection 200 is provided with a traffic light, the own vehicle has to follow the signal indication as a matter of of course.

Next, in Step S16, the traveling control apparatus 1 may determine whether a preceding vehicle is detected. If a preceding vehicle is detected (Step S16: YES), the procedure may proceed to Step S21. In contrast, if no preceding vehicle is detected (Step S16: NO), the procedure may proceed to Step S17.

In Step S17, the traveling control apparatus 1 may determine the condition on an oncoming lane. In one example, the traveling control apparatus 1 may determine whether traffic congestion has been generated on an oncoming lane. If it is determined that traffic congestion has been generated on the oncoming lane (Step S17: YES), the procedure may proceed to Step S31. If it is not determined that traffic congestion has been generated on the oncoming lane (Step S17: NO), the procedure may proceed to Step S18.

In Step S18, the traveling control apparatus 1 may continue to execute the intersection U-turn traveling control. After completing the intersection U-turn traveling control, the traveling control apparatus 1 may end the series of processes and continue to perform the traveling control in the automatic drive mode (RETURN).

In contrast, if a preceding vehicle is detected in Step S16 described above (Step S16: YES) and the procedure proceeds to Step S21, the traveling control apparatus 1 may determine in Step S21 whether the preceding vehicle is performing the U-turn travel. The determination as to whether the preceding vehicle is performing the U-turn travel may be made as follows.

In one example, the determination may be made on the basis of a movement of the position of the preceding vehicle recognized in the image data acquired by the camera unit 21 (the surrounding environment information acquisition device). For example, in a case where the position of the detected preceding vehicle largely moves to the right without moving separate away from the own vehicle in the depth direction of the image, it may be estimated that the recognized preceding vehicle is performing the U-turn travel.

If it is determined in Step S21 that the preceding vehicle is performing the U-turn travel (Step S21: YES), the procedure may proceed to Step S22. If it is not determined in Step S21 that the preceding vehicle is performing the U-turn travel (Step S21: NO), the procedure may return to Step S16. Note that, if it is not determined that the preceding vehicle is performing the U-turn travel, it may be determined that the preceding vehicle is performing right-turn travel or left-turn travel, or advancing straight.

In the example illustrated in FIG. 2, the own vehicle and the preceding vehicle may travel on the own-vehicle traveling lane 201a adjacent to the middle of the own-vehicle traveling road 201 out of the two lanes of the own-vehicle traveling road 201 extending in one direction. In this example, if it is not determined that the preceding vehicle is performing the U-turn travel, it may be determined that the preceding vehicle is performing the right-turn travel or advancing straight. In contrast, in the examples illustrated in FIGS. 3 and 4, if it is not determined that the preceding vehicle is performing the U-turn travel, it may be determined that the preceding vehicle is performing the right-turn travel, the left-turn travel, or advancing straight.

In Step S22, the traveling control apparatus 1 may perform traveling control to secure an inter-vehicle distance between the own vehicle and the preceding vehicle. For example, the traveling control apparatus 1 may perform deceleration control to secure a large inter-vehicle distance between the own vehicle and the preceding vehicle.

In Step S23, the traveling control apparatus 1 may determine whether the preceding vehicle has completed the U-turn travel. If it is determined that the preceding vehicle has completed the U-turn travel (Step S23: YES), the procedure may proceed to Step S17. In contrast, if it is not determined that the preceding vehicle has completed the U-turn travel (Step S23: NO), the procedure may proceed to Step S24.

Note that it may be determined that the preceding vehicle has not completed the U-turn travel in a case where the preceding vehicle is having trouble in performing the U-turn travel, where the preceding vehicle has failed to complete the U-turn travel, or where the preceding vehicle is moving backward and then moving forward (i.e., performing the three-point turn), for example.

In Step S24, the traveling control apparatus 1 may perform brake control to temporarily stop the own vehicle for a predetermined period of time in order to keep the inter-vehicle distance between the own vehicle and the preceding vehicle.

That is, if it is not determined that the preceding vehicle has completed the U-turn travel (Step S23: NO), the traveling control apparatus 1 of the own vehicle may stop the own vehicle for a predetermined period of time and wait for the preceding vehicle to complete the U-turn travel. After the predetermined period of time, the procedure may return to Step S23 in which the determination described above is performed. The traveling control apparatus 1 may temporarily stop the own vehicle until the preceding vehicle completes the U-turn travel.

If it is determined in Step S17 describe above that traffic congestion has been generated on the oncoming lane (Step S17: YES) and the procedure thus proceeds to Step S31, the traveling control apparatus 1 may determine in Step S31 whether the sufficient region which the own vehicle is to enter after completing the U-turn travel (i.e., the post U-turn own vehicle region F, see FIG. 4) is secured on the oncoming lane (which serves as the own-vehicle traveling lane after the own vehicle completes the U-turn travel). If it is determined that the sufficient post U-turn own vehicle region F is secured (Step S31: YES), the procedure may proceed to Step S18. If it is not determined that the sufficient post U-turn own vehicle region F is secured (Step S31: NO), the procedure may proceed to Step S32.

In Step S32, the traveling control apparatus 1 may switch the scheduled intersection U-turn traveling control to the right-turn traveling control to turn right at the intersection.

Thereafter, in Step S33, the traveling control apparatus 1 may start the right-turn traveling control. Now, the right-turn traveling control to be performed after the scheduled U-turn traveling control is switched to the right-turn traveling control is described with reference to FIG. 6.

Figure 6:
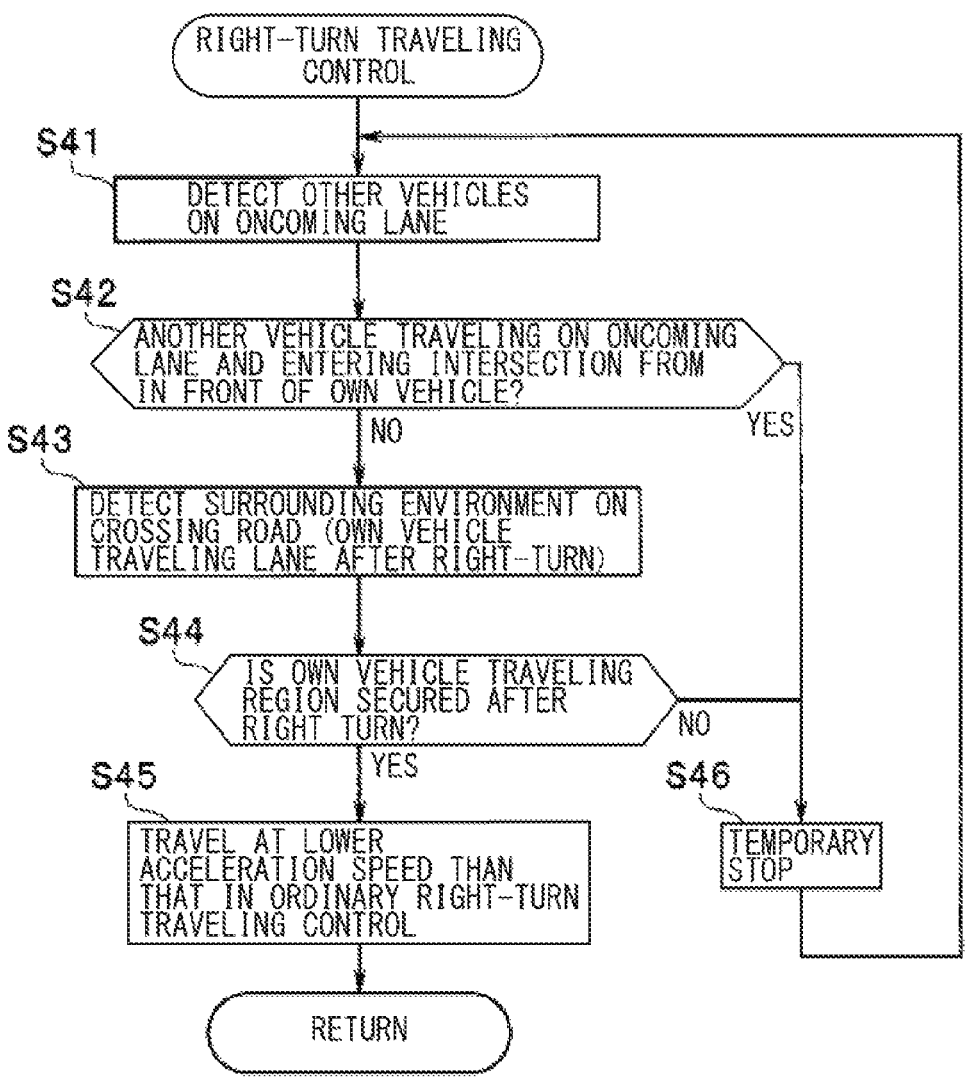
FIG. 6 is a flowchart of a sub-routine of the right-turn traveling control in Step S33 in FIG. 5.

When the right-turn traveling control is started in Step S33 in FIG. 5, the traveling control apparatus 1 may recognize, in Step S41 in FIG. 6, the surrounding environment such as other vehicles on the oncoming lane on the basis of the information acquired by the surrounding environment information acquisition device (i.e., the surrounding environment monitoring unit 20 and the camera unit 21), for example.

In general, in a situation where traffic congestion has been generated, other vehicles having passed through the intersection may stop in a queue on the oncoming lane, for example, and a vehicle at the tail of the queue may temporarily stop at a position near the intersection. In such a situation, even if the traffic light is green, another vehicle traveling on the oncoming lane and going to pass straight through the intersection may temporarily stop immediately before a stop line provided before the intersection because parking and stopping are prohibited in the intersection. While the traffic light is green, the other vehicle temporarily stopping in such a situation may suddenly move forward depending on the condition of the queue of the other vehicles having passed through the intersection. Thus, in a case where traffic congestion has been generated on the oncoming lane, for example, the traveling control apparatus 1 has to watch for behaviors of the other vehicles on the oncoming lane. At the same time, the traveling control apparatus 1 has to always detect the presence or behavior of a traffic light, a pedestrian, or a bicycle in the peripheral region around the intersection, for example.

In Step S42, the traveling control apparatus 1 may determine whether another vehicle traveling on the oncoming lane and going to enter the intersection from in front of the own vehicle has been detected on the basis of the result of the process in Step S41 described above. If the other vehicle traveling on the oncoming lane and going to enter the intersection from in front of the own vehicle has been detected (Step S42: YES), the procedure may proceed to Step S46 in which the traveling control apparatus 1 temporarily stops the own vehicle. Thereafter, the procedure may return to Step S41, and the process in Step S41 described above may be repeated. In contrast, if the other vehicle traveling on the oncoming lane and going to enter the intersection from in front of the own vehicle has not been detected (Step S42: NO), the procedure may proceed to Step S43.

In Step S43, the traveling control apparatus 1 may detect a surrounding environment on the cross road, in particular, a region of an own-vehicle traveling lane which the own vehicle is to enter after turning right on the basis of the information acquired by the surrounding environment information acquisition device (i.e., the surrounding environment monitoring unit 20 and the camera unit 21).

In general, in a case where traffic congestion has been generated, a situation may arise where the other vehicle traveling on the oncoming lane and going to enter the intersection gives up passing straight through the intersection and turns left to avoid the traffic congestion, for example. In this case, the own vehicle turning right and the other vehicle turning left from the oncoming lane may enter the same traveling lane of the cross road. Thus, there is a possibility of contact between the own vehicle and the other vehicle. Further, traffic congestion may be generated not only on the oncoming lane but also on the cross road. For example, in a case where traffic congestion has been generated also on the traveling lane of the cross road on which the own vehicle is to travel after turning right, a situation may arise where another vehicle at the tail of the queue of other vehicles stopping on the traveling lane of the cross road temporarily stops at a position near the intersection. In such a situation, there may be no sufficient region which the own vehicle is to enter after turning right. Thus, in a case where traffic congestion has been generated on the oncoming lane, for example, the traveling control apparatus 1 has to watch for behaviors of the other vehicles on the oncoming lane. At the same time, the traveling control apparatus 1 has to always detect the presence and behavior of the traffic light, a pedestrian, or a bicycle in a peripheral region around the intersection, for example.

In Step S44, the traveling control apparatus 1 may determine whether a region in which the own vehicle is to travel after turning right is detected on the traveling lane of the cross road as a result of the process in Step S43 described above. If the region in which the own vehicle is to travel after turning right is not detected (Step S44: NO), the procedure may proceed to Step S46 in which the traveling control apparatus 1 temporarily stops the own vehicle. Thereafter, the procedure may return to Step S41, and the process in Step S41 described above may be repeated. In contrast, if the region in which the own vehicle is to travel after turning right is detected on the traveling lane of the cross road as a result of the process in Step S43 (Step S44: YES), the procedure may proceed to Step S45.

In Step S45, the traveling control apparatus 1 may perform the acceleration control to cause the own vehicle to travel at a lower acceleration speed than that in the ordinary right-turn traveling control.

According to the foregoing example embodiment, in a case where the target traveling route set in the automated driving control involves the U-turn traveling control at an intersection, the traveling position of the own vehicle is shifted more leftward (the left-shifted course is set) within the own-vehicle traveling lane in the intersection U-turn traveling control than in the ordinary right-turn traveling control. Further, the steering start point at which steering for right turning starts during the U-turn traveling control is set farther from the own vehicle in the traveling direction than the steering start point for the ordinary right-turn traveling control is. That is, the steering start timing in the intersection U-turn traveling control is set at a later timing than the steering start timing in the ordinary right-turn traveling control.

In this case, as the width of the own-vehicle traveling road or the width of the cross road becomes narrower, i.e., in accordance with the dimensions of the intersection, the traveling position of the own vehicle is shifted more leftward within the own-vehicle traveling lane, and the steering start timing may be set at a much later timing.

Further, in a case where a preceding vehicle performing the U-turn travel in the intersection is detected during the intersection U-turn traveling control, the traveling control to secure a large inter-vehicle distance between the own vehicle and the preceding vehicle may be performed. As the width of the own-vehicle traveling road or the width of the cross road becomes narrower, i.e., in accordance with the dimensions of the intersection, the inter-vehicle distance between the own vehicle and the preceding vehicle may increase.

Further, in a case where there is no region on a traveling lane (i.e., the oncoming lane) which the own vehicle is to enter after completing the U-turn travel (i.e., there is no post U-turn own vehicle region) due to traffic congestion on the oncoming lane, the scheduled intersection U-turn traveling control may be cancelled and switched to the right-turn traveling control before the own vehicle enters the intersection in which the intersection U-turn traveling control is scheduled to be performed. In this case, the acceleration control may be performed at a lower acceleration speed than that in the ordinary right-turn traveling control.

Such control makes it possible for the own vehicle to surely and smoothly complete the U-turn travel within the intersection by performing a single steering operation without performing the three-point turn. Accordingly, it is possible for the own vehicle to perform the U-turn travel in the intersection while maintaining a smooth traffic flow and ensuring safety. Further, avoiding unnecessary traveling contributes to an improvement in fuel consumption.

Further, the scheduled U-turn traveling control may be switched to the right-turn traveling control in accordance with the surrounding environment such as traffic congestion on the oncoming lane.

Accordingly, it is possible for the own vehicle to travel while maintaining a smooth traffic flow and ensuring safety.

When the scheduled U-turn traveling control is switched to the right-turn traveling control under the automated driving control, the acceleration control may be performed at a lower acceleration speed than that in the ordinary right-turn traveling control. Accordingly, it is possible to achieve safe and smooth control switching without making the driver feel anxious or strange upon the control switching.

Even if the surrounding environment (traffic congestion condition) is not fully detected on the basis of the map information and the traffic congestion information acquired by the locator unit 11, for example, the actual surrounding environment (traffic congestion condition) may be detected by the camera unit 21 (the surrounding environment information acquisition device), for example, and the traveling control may be switched on the basis of the results of the detection. Accordingly, it is possible for the own vehicle to travel safely while maintaining a smooth traffic flow without making the driver feel anxious or strange.

In the foregoing example embodiments, both of the left-shifted course and the steering start point may be set in the U-turn traveling control; however, this is non-limiting. For example, one or both of the left-shifted course and the steering start point may be set in the U-turn traveling control.

The disclosure is not limited to the foregoing example embodiments, and various modifications may be made without departing from the gist of the disclosure. Further, the foregoing example embodiments each include various stages of the disclosure, and various technologies may be extracted by appropriately combining the features of the disclosure described herein. For example, in a case where the above-described concerns may be addressed and the above-described effects may be obtained even if some features are deleted from all the features disclosed herein, the remaining features may be extracted as a technology. Furthermore, various components in the foregoing example embodiments may be combined as appropriate. The disclosure is limited by the appended claims but is not restricted by any particular example embodiment.

The example embodiment described above explains an example of a traveling control apparatus in the case where the subject vehicle travels on a road where drivers keep to the left by law. Needless to say, if the traveling control apparatus is to be applied to a road where drivers keep to the right by law, left and right settings or the like may be appropriately set in an opposite manner.

One or more of the surrounding environment monitoring unit 20, the camera unit 21, the locator unit 11, and the traveling control unit 22 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the surrounding environment monitoring unit 20, the camera unit 21, the locator unit 11, and the traveling control unit 22. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the surrounding environment monitoring unit 20, the camera unit 21, the locator unit 11, and the traveling control unit 22 illustrated in FIG. 1.

The invention claimed is:
1. A traveling control apparatus for a vehicle, the traveling control apparatus comprising:

a surrounding environment information acquisition device configured to acquire surrounding environment information on a surrounding environment of the vehicle;

a map information acquisition device configured to acquire road information on a road present near a traveling position of the vehicle; and a traveling control unit configured to:

cause the vehicle to automatically travel along a target traveling route preliminarily set;

recognize, based on the surrounding environment information and the road information, an intersection located ahead of the vehicle on the target traveling route in which U-turn traveling control for performing a U-turn travel to an oncoming lane is scheduled to be performed; and in response to recognizing the intersection, perform one or both of:

setting a traveling course, within a traveling lane of the vehicle before entering the intersection in which the U-turn travel is scheduled to be performed, that is shifted by a predetermined distance in a lateral direction away from the oncoming lane; and setting a steering start point in the U-turn travel at a position farther ahead in the traveling direction of the vehicle than a steering start point used when performing left or right turning control to cross the oncoming lane and enter a cross road.

2. The traveling control apparatus according to claim 1, wherein the traveling control unit is further configured to set the traveling course and the steering start point in the U-turn travel on a basis of the surrounding environment of the vehicle and information on the intersection recognized, and increase the predetermined distance and set the steering start point in the U-turn travel at a position even farther from the vehicle in the traveling direction as a dimension of the intersection becomes narrower.

3. The traveling control apparatus according to claim 1, wherein the traveling control unit is further configured to perform steering control at a higher steering speed in a case where the steering start point in the U-turn travel is set at the position farther ahead in the traveling direction of the vehicle than the steering start point used when performing the left or right turning control to cross the oncoming lane and enter the cross road.

4. The traveling control apparatus according to claim 1, wherein, the traveling control unit is configured to, upon recognizing (1) the intersection in which the U-turn traveling control is scheduled to be performed on the target traveling route and located ahead of the vehicle and (2) a preceding vehicle performing U-turn travel in the intersection, perform traveling control to secure a large inter-vehicle distance between the vehicle and the preceding vehicle.

5. The traveling control apparatus according to claim 1, wherein, the traveling control unit is configured to, upon recognizing (1) the intersection located ahead of the vehicle on the target traveling route in which the U-turn traveling control is scheduled to be performed, and (2) an absence of a region in a traveling lane to be entered by the vehicle after completing the U-turn traveling control, switch the U-turn traveling control scheduled to be performed to the left or right traveling control.

6. A traveling control apparatus for a vehicle, the traveling control apparatus comprising circuitry configured to:

acquire surrounding environment information on a surrounding environment of the vehicle;

acquire road information on a road present near a traveling position of the vehicle;

cause the vehicle to automatically travel along a target traveling route preliminarily set;

recognize, based on the surrounding environment information and the road information, an intersection located ahead of the vehicle on the target traveling route in which U-turn traveling control for performing a U-turn travel to an oncoming lane is scheduled to be performed; and in response to recognizing the intersection, perform one or both of:

setting a traveling course, within a traveling lane of the vehicle before entering the intersection in which the U-turn travel is scheduled to be performed, that is shifted by a predetermined distance in a lateral direction away from the oncoming lane; and setting a steering start point in the U-turn travel at a position farther ahead in the traveling direction of the vehicle than a steering start point used when performing left or right turning control to cross the oncoming lane and enter a cross road.

* * * * *